United States Patent Office 2,743,251
Patented Apr. 24, 1956

2,743,251

OXYALKYLATED AMINE-MODIFIED THERMO-PLASTIC PHENOL-ALDEHYDE RESINS, AND METHOD OF MAKING SAME

Melvin De Groote, University City, Mo., assignor to Petrolite Corporation, Wilmington, Del., a corporation of Delaware No Drawing. Application July 30, 1952,
Serial No. 301,803

8 Claims. (Cl. 260—45)

The present invention is a continuation-in-part of my co-pending application, Serial No. 288,742, filed May 19, 1952. The present invention is concerned with derivatives obtained by the oxyalkylation, particularly the oxyethylation or oxypropylation, of certain resin condensates.

These resin condensates are described in detail in the aforementioned co-pending application, Serial No. 288,742, and are obtained by the process of condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

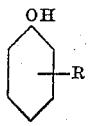

in which R is an aliphatic hydrocarbon radical having at least 4 and not more than 24 carbon atoms and substituted in the 2,4,6 position; (b) a basic nonhydroxylated secondary monoamine having not more than 32 carbon atoms in any group attached to the amino nitrogen atom. and (c) formaldehyde; said condensation reaction being conducted at a temperature sufficiently high to eliminate water and below the pyrolytic point of the reactants and resultants of reaction; and with the proviso that the resinous condensation product resulting from the process be heat-stable and oxyalkylation-susceptible.

Compounds or derivatives are obtained by the process of oxyalkylating said amine-modified resin condensates by a member selected from the class of ethylene oxide, propylene oxide, butylene oxide, glycide and methylglycide. One aspect of the invention is, of course, the procedure for obtaining such oxyalkylation products.

In many instances and for various purposes, particularly for the resolution of petroleum emulsions of the water-in-oil type, one may combine a comparatively large proportion of the alkylene oxide, particularly propylene oxide or a combination of propylene oxide and ethylene oxide, with a comparatively small proportion of the resin condensate. In some instances the ratio by weight has been as high as 50-to-1, i. e., the ultimate product of reaction contained approximately 2% of resin condensate and approximately 98% of alkylene oxide.

This invention in a more limited aspect as far as the reactants are concerned which are subjected to oxyalkylation are certain amine-modified thermoplastic phenol-aldehyde resins. Such amine-modified resins are described in the aforementioned co-pending application and much that is said herein is identical with the text of said aforementioned co-pending application. For purpose of simplicity the invention, purely from a standpoint of the resin condensate involved, may be exemplified by an idealized formula as follows:

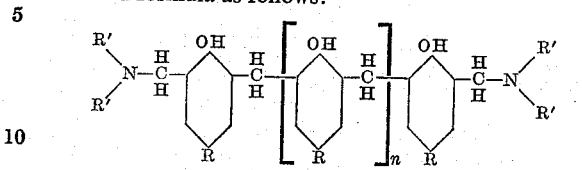

in which R represents an aliphatic hydrocarbon substituent generally having 4 and not over 18 carbon atoms but most preferably not over 14 carbon atoms, and $n$ generally is a small whole number varying from 1 to 4. In the resin structure it is shown as being derived from formaldehyde although obviously other aldehydes are equally satisfactory. The amine residue in the above structure is derived from a basic amine, and usually a strongly basic amine, and may be indicated thus:

in which R' represents any appropriate carbon-linked radical, such as an alkyl, alicyclic, arylalkyl radical, etc., free from hydroxyl radicals The term "carbon-linked radical" is intended to mean a radical attached to the nitrogen atom of the above formula by a bond from a carbon atom. The only limitation is that the radical should not be a negative radical, which considerably reduces the basicity of the amine, such as an aryl radical or an acyl radical. Needless to say, the two occurrences of R' may jointly represent a single divalent radical instead of two monovalent radicals. This is illustrated by morpholine and piperidine. The introduction of two such amino radicals into a comparatively small resin molecule, for instance, one having 3 to 6 phenolic nuclei as specified, alters the resultant product in a number of ways. In the first place, a basic nitrogen atom, of course, adds a hydrophile effect; in the second place, depending on the size of the radical R', there may be a counterbalancing hydrophobe effect or one in which the hydrophobe effect more than counterbalances the hydrophile effect of the nitrogen atom. Finally, in such cases where R' contains one or more oxygen atoms, another effect is introduced, particularly another hydrophile effect.

I am not aware that it has been previously suggested to modify resins of the kind herein described by oxyalkylation, such as oxyethylation or oxypropylation.

Referring again to the resins as such, it is worth noting that combinations, either resinous or otherwise, have been prepared from phenols, aldehydes, and reactive amines, particularly monoamines.

Combinations, resinous or otherwise, have been prepared from phenols, aldehydes, and reactive amines, particularly amines having secondary amino groups. Generally speaking, such materials have fallen into three classes; the first represents non-resinous combinations derived from phenols as such; the second class represents resins which are usually insoluble and used for the purpose for which ordinary resins, particularly thermo-setting resins are adapted. The third class represents resins which are soluble as initially prepared but are not heat-stable, i. e., they are heat-convertible, which means they are not particularly suited as raw materials for subsequent chemical reaction which requires temperatures above the boiling point of water or thereabouts.

As to the preparation of the first class, i. e., non-resinous materials obtained from phenols, aldehydes and amines, particularly secondary amines, see United States Patents Nos. 2,218,739, dated October 22, 1940, to Bruson; 2,033,092, dated March 3, 1936, to Bruson; and 2,036,916, dated April 7, 1936, to Bruson.

As to a procedure by which a resin is produced as such involving all three reactants and generally resulting in an insoluble resin, or in any event, a resin which becomes insoluble in presence of added formaldehyde or the like, see United States Patents Nos. 2,341,907, dated February 15, 1944, to Cheetham et al.; 2,122,433, dated July 5, 1938, to Meigs; 2,168,335, dated August 8, 1939, to Heckert; 2,098,869, dated November 9, 1937, to Harmon et al.; and 2,211,960, dated August 20, 1940, to Meigs.

A third class of material which approaches the closest to the herein-described derivatives or resinous amino derivatives is described in U. S. Patent No. 2,031,557, dated February 18, 1936, to Bruson.

The resins employed as raw materials in the instant procedure are characterized by the presence of an aliphatic radical in the ortho or para position, i. e., the phenols themselves are difunctional phenols. This is a differentiation from the resins described in the aforementioned Bruson patent, No. 2,031,557, insofar that said patent discloses suitable resins obtained from metasubstituted phenols, hydroxybenzene, resorcinol, p,p'(dihydroxydiphenyl)-dimethylmethane, and the like, all of which have at least three points of reaction per phenolic nuclei and as a result can yield resins which may be at least incipiently cross-linked even though they are apparently still soluble in oxygenated organic solvents or else are heat-reactive insofar that they may approach insolubility or become insoluble due to the effect of heat, or added formaldehyde, or both.

The resins herein employed contain only two terminal groups which are reactive to formaldehyde, i. e., they are difunctional from the standpoint of methylol-forming reactions. As is well known, although one may start with difunctional phenols, and depending on the procedure employed, one may obtain cross-linking which indicates that one or more of the phenolic nuclei have been converted from a difunctional radical to a trifunctional radical, or in terms of the resin, the molecule as a whole has a methylol-forming reactivity greater than 2. Such shift can take place after the resin has been formed or during resin formation. Briefly, an example is simply where an alkyl radical, such as methyl, ethyl, propyl, butyl, or the like, shifts from an ortho position to a meta position, or from a para position to a meta position. For instance, in the case of phenol-aldehyde varnish resins, one can prepare at least some in which the resins, instead of having only two points of reaction can have three, and possibly more points of reaction, with formaldehyde, or any other reactant which tends to form a methylol or substituted methylol group.

Apparently there is no similar limitation in regard to the resins employed in the aforementioned Bruson Patent 2,031,557, for the reason that one may prepare suitable resins from phenols of the kind already specified which invariably and inevitably would yield a resin having a functionality greater than two in the ultimate resin molecule.

The resins herein employed are soluble in a non-oxygenated hydrocarbon solvent, such as benzene or xylene. As pointed out in the aforementioned Bruson Patent 2,031,557, one of the objectives is to convert the phenolaldehyde resins employed as raw materials in such a way as to render them hydrocarbon soluble, i. e., soluble in benzene. The original resins of U. S. Patent 2,031,557 are selected on the basis of solubility in an oxygenated inert organic solvent, such as alcohol or dioxane. It is immaterial whether the resins here employed are soluble in dioxane or alcohol, but they must be soluble in benzene.

The resins herein employed as raw materials must be comparatively low molal products having on the average 3 to 6 nuclei per resin molecule. The resins employed in the aforementioned U. S. Patent No. 2,031,557, apparently need not meet any such limitations.

The condensation products here obtained, whether in the form of the free base or the salt, do not go over to the insoluble stage on heating. This apparently is not true of the materials described in aforementioned Bruson Patent 2,031,557 and apparently one of the objectives with which the invention is concerned, is to obtain a heatconvertible condensation product. The condensation product obtained according to the present invention is heat stable and, in fact, one of its outstanding qualities is that it can be subjected to oxyalkylation, particularly oxyethylation or oxypropylation, under conventional conditions, i. e., presence of an alkaline catalyst, for example, but in any event at a temperature above 100° C. without becoming an insoluble mass.

Although these condensation products have been prepared primarily with the thought in mind that they are precursors for subsequent reaction, yet as such and without further reaction, they have definitely valuable properties and uses as hereinafter pointed out.

What has been said previously in regard to heat stability, particularly when employed as a reactant for preparation of derivatives, is still important from the standpoint of manufacture of the condensation products themselves insofar that in the condensation process employed in preparing the compounds described subsequently in detail, there is no objection to the employing of a temperature above the boiling point of water. As a matter of fact, all the examples included subsequently employ temperatures going up to 140° to 150° C. If one were using resins of the kind described in U. S. Patent No. 2,031,557 it appears desirable and perhaps absolutely necessary that the temperature be kept relatively low, for instance, between 20° C. and 100° C., and more specifically at a temperature of 80° to 90° C. There is no such limitation in the condensation procedure herein described for reasons which are obvious in light of what has been said previously.

What is said above deserves further amplification at this point for the reason that it may shorten what is said subsequently in regard to the production of the herein described condensation products. As pointed out in the instant invention the resin selected is xylene or benzene soluble, which differentiates the resins from those employed in the forementioned Bruson Patent No. 2,031,557. Since formaldehyde generally is employed economically in an aqueous phase (30% to 40% solution, for example) it is necessary to have manufacturing procedure which will allow reactions to take place at the interface of the two immiscible liquids, to wit, the formaldehyde solution and the resin solution, on the assumption that generally the amine will dissolve in one phase or the other. Although reactions of the kind herein described will begin at least at comparatively low temperatures, for instance, 30° C., 40° C., or 50° C., yet the reaction does not go to completion except by the use of the higher temperatures. The use of higher temperatures means, of course, that the condensation product obtained at the end of the reaction must not be heat reactive. Of course, one can add an oxygenated solvent such as alcohol, dioxane, various ethers of glycols, or the like, and produce a homogeneous phase. If this latter procedure is employed in preparing the herein described condensations it is purely a matter of convenience, but whether it is or not, ultimately the temperature must still pass within the zone indicated elsewhere, i. e., somewhere above the boiling point of water unless some obvious equivalent procedure is used.

Any reference, as in the hereto appended claims, to the procedure employed in the process is not intended to limit the method or order in which the reactants are added, commingled or reacted. The procedure has been referred to as a condensation process for obvious reasons. As pointed out elsewhere it is my preference to dissolve the resin in a suitable solvent, add the amine, and then add the formaldehyde as a 37% solution. However, all three reactants can be added in any order. I am inclined to believe that in the presence of a basic catalyst, such as the amine employed, that the formaldehyde produces methylol groups attached to the phenolic nuclei which, in turn, react with the amine. It would be immaterial, of course, if the formaldehyde reacted with the amine so as to introduce a methylol group attached to nitrogen which, in turn, would react with the resin molecule. Also, it would be immaterial if both types of compounds were formed which reacted with each other with the evolution of a mole of formaldehyde available for further reaction. Furthermore, a reaction could take place in which three different molecules are simultaneously involved although, for theoretical reasons, that is less likely. What is said herein in this respect is simply by way of explanation to avoid any limitation in regard to the appended claims.

Since the amines herein employed are nonhydroxylated it is obvious the amine-modified resin is susceptible to oxyalkylation by virtue of the phenolic hydroxyl radicals. Referring to the idealized formula which appeared previously it is obvious the oxyalkylated derivatives, or at least a substantial portion of them, could be indicated in the following manner:

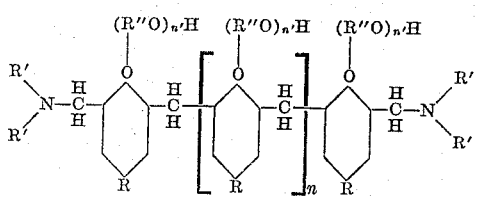

in which R″O is the radical of alkylene oxide, such as the ethoxy, propoxy or similar radicals derived from glycide, ethylene oxide, propylene oxide, or the like, and $n'$ is a number varying from 1 to 60, with the proviso that one need not oxyalkylate all the available phenolic hydroxyl radicals. In other words, one need only convert two phenolic hydroxyl radicals per resin molecule. Stated another way, $n'$ can be zero as well as a whole number subject to what has been said immediately preceding, all of which will be considered in greater detail subsequently.

One important use of the herein described products is in the resolution of petroleum emulsions of the water-in-oil type.

As far as the use of the herein described products goes for purpose of resolution of petroleum emulsions of the water-in-oil type, I particularly prefer to use those which as such or in the form of the free base or hydrate, i. e., combination with water or particularly in the form of a low molal organic acid such as the acetate or hydroxy acetate, have sufficiently hydrophile character to at least meet the test set forth in U. S. Patent No. 2,499,368, dated March 7, 1950, to De Groote et al. In said patent such test for emulsification using a water-insoluble solvent, generally xylene, is described as an index of surface activity.

In the present instance the various condensation products as such or in the form of the free base or in the form of the acetate, may not necessarily be xylene-soluble although they are in many instances. If such compounds are not xylene-soluble the obvious chemical equivalent or equivalent chemical test can be made by simply using some suitable solvent, preferably a water-soluble solvent such as ethylene glycol diethylether, or a low molal alcohol, or a mixture to dissolve the appropriate product being examined and then mix with the equal weight of xylene, followed by addition of water. Such test is obviously the same for the reason that there will be two phases on vigorous shaking and surface activity makes its presence manifest. It is understood the reference in the hereto appended claims as to the use of xylene in the emulsification test includes such obvious variant.

Reference is again made to U. S. Patent 2,499,368 dated March 7, 1950, to De Groote and Keiser. In said immediately aforementioned patent the following test appears:

"The same is true in regard to the oxyalkylated resins herein specified, particularly in the lower stage of oxyalkylation, the so-called 'sub-surface-active' stage. The surface-active properties are readily demonstrated by producing a xylene-water emulsion. A suitable procedure is as follows: The oxyalkylated resin is dissolved in an equal weight of xylene. Such 50–50 solution is then mixed with 1–3 volumes of water and shaken to produce an emulsion. The amount of xylene is invariably sufficient to reduce even a tacky resinous product to a solution which is readily dispersible. The emulsions so produced are usually xylene-in-water emulsions (oil-in-water type) particularly when the amount of distilled water used is at least slightly in excess of the volume of xylene solution and also if shaken vigorously. At times, particularly in the lowest stage of oxyalkylation, one may obtain a water-in-xylene emulsion (water-in-oil type) which is apt to reverse on more vigorous shaking and further dilution with water.

If in doubt as to this property, comparison with a resin obtained from para-tertiary butylphenol and formaldehyde (ratio 1 part phenol to 1.1 formaldehyde) using an acid catalyst and then followed by oxyalkylation using 2 moles of ethylene oxide for each phenolic hydroxyl, is helpful. Such resin prior to oxyalkylation has a molecular weight indicating about 4½ units per resin molecule. Such resin, when diluted with an equal weight of xylene, will serve to illustrate the above emulsification test.

In a few instances, the resin may not be sufficiently soluble in xylene alone but may require the addition of some ethylene glycol diethylether as described elsewhere. It is understood that such mixture, or any other similar mixture, is considered the equivalent of xylene for the purpose of this test.

In many cases, there is no doubt as to the presence or absence of hydrophile or surface-active characteristics in the products used in accordance with this invention. They dissolve or disperse in water; and such dispersions foam readily. With borderline cases, i. e., those which show only incipient hydrophile or surface-active property (sub-surface-activity) tests for emulsifying properties or self-dispersibility are useful. The fact that a reagent is capable of producing a dispersion in water is proof that it is distinctly hydrophile. In doubtful cases, comparison can be made with the butylphenol-formaldehyde resin analog wherein 2 moles of ethylene oxide have been introduced for each phenolic nucleus.

The presence of xylene or an equivalent water-insoluble solvent may mask the point at which a solvent-free product on mere dilution in a test tube exhibits self-emulsification. For this reason, if it is desirable to determine the approximate point where self-emulsification begins, then it is better to eliminate the xylene or equivalent from a small portion of the reaction mixture and test such portion. In some cases, such xylene-free resultant may show initial or incipient hydrophile properties, whereas in presence of xylene such properties would not be noted. In other cases, the first objective indication of hydrophile properties may be the capacity of the material to emulsify an insoluble solvent such as xylene. It is to be emphasized that hydrophile properties herein referred to are such as those exhibited by incipient self-emulsification or the presence of emulsifying properties and go through the range of homogeneous dispersibility or admixture with water even in presence of added water-insoluble solvent and minor proportions of common electrolytes as occur in oil field brines.

Elsewhere, it is pointed out that an emulsification test may be used to determine ranges of surface-activity and that such emulsification tests employ a xylene solution. Stated another way, it is really immaterial whether a xylene solution produces a sol or whether it merely produces an emulsion."

Having described the invention briefly and not necessarily in its most complete aspect, the text immediately following will be a more complete description with specific reference to reagents and the method of manufacture.

For convenience the subsequent text will be divided into five parts:

Part 1 is concerned with the general structure of the amine-modified resin condensates and also the resin itself, which is used as a raw material;

Part 2 is concerned with appropriate basic secondary monoamines free from a hydroxyl radical which may be employed in the preparation of the herein described amine-modified resins or condensates;

Part 3 is concerned with the condensation reactions involving the resin, the amine, and formaldehyde to produce the specific products or compounds;

Part 4 is concerned with the oxyalkylation of the products described in Part 3, preceding; and Part 5 is concerned with uses for the products outlined in Part 4, preceding.

In the subsequent text, Parts 1, 2, and 3 appear in substantially the same form as in the text of aforementioned co-pending application, Serial No. 288,742, filed May 19, 1952, for both purpose of convenience and comparison.

PART 1

It is well known that one can readily purchase on the open market, or prepare, fusible, organic solvent-soluble, water-insoluble resin polymers of a composition approximated in an idealized form by the formula

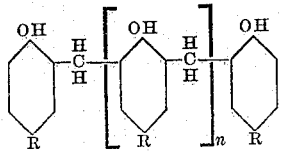

In the above formula $n$ represents a small whole number varying from 1 to 6, 7 or 8, or more, up to probably 10 or 12 units, particularly when the resin is subjected to heating under a vacuum as described in the literature. A limited sub-genus is in the instance of low molecular weight polymers where the total number of phenol nuclei varies from 3 to 6, i. e., $n$ varies from 1 to 4; R represents an aliphatic hydrocarbon substituent, generally an alkyl radical having from 4 to 14 carbon atoms, such as a butyl, amyl, hexyl, decyl or dodecyl radical. Where the divalent bridge radical is shown as being derived from formaldehyde it may, of course, be derived from any other reactive aldehyde having 8 carbon atoms or less.

Because a resin is organic solvent-soluble does not mean it is necessarily soluble in any organic solvent. This is particularly true where the resins are derived from trifunctional phenols as previously noted. However, even when obtained from a difunctional phenol, for instance para-phenylphenol, one may obtain a resin which is not soluble in a nonoxygenated solvent, such as benzene, or xylene, but requires an oxygenated solvent such as a low molal alcohol, dioxane, or diethylglycol diethylether. Sometimes a mixture of the two solvents (oxygenated and nonoxygenated) will serve. See Example 9a of U. S. Patent No. 2,499,365, dated March 7, 1950, to De Groote and Keiser.

The results herein employed as raw materials must be soluble in a nonoxygenated solvent, such as benzene or xylene. This presents no problem insofar that all that is required is to make a solubility test on commercially available resins, or else prepare resins which are xylene or benzene-soluble as described in aforementioned U. S. Patent No. 2,499,365, or in U. S. Patent No. 2,499,368 dated March 7, 1950, to De Groote and Keiser. In said patents there are described oxyalkylation-susceptible, fusible, nonoxygenated-organic solvent-soluble, water-insoluble, low-stage phenol-aldehyde resins having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

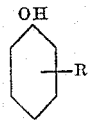

in which R is an aliphatic hydrocarbon radical having at least 4 carbon atoms and not more than 24 carbon atoms, and substituted in the 2,4,6 position.

If one selected a resin of the kind just described previously and reacted approximately one mole of the resin with two moles of formaldehyde and two moles of a basic nonhydroxylated secondary amine as specified, following the same idealized over-simplification previously referred to, the resultant product might be illustrated thus:

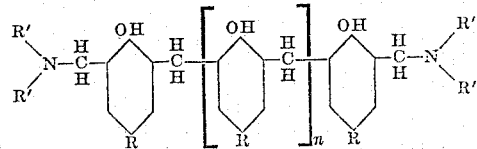

The basic amine may be designated thus:

In conducting reactions of this kind one does not necessarily obtain a hundred per cent yield for obvious reasons. Certain side reactions may take place. For instance, 2 moles of amine may combine with one mole of the aldehyde, or only one mole of the amine may combine with the resin molecule, or even to a very slight extent, if at all, 2 resin units may combine without any amine in the reaction product, as indicated in the following formulas:

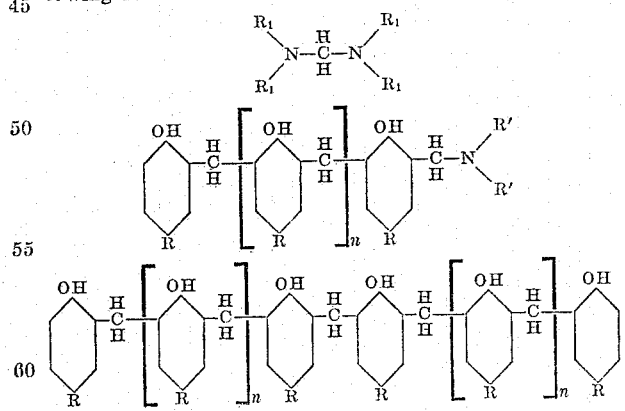

As has been pointed out previously, as far as the resin unit goes one can use a mole of aldehyde other than formaldehyde, such as acetaldehyde, propionaldehyde or butyraldehyde. The resin unit may be exemplified thus:

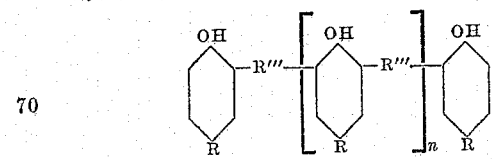

in which R''' is the divalent radical obtained from the particular aldehyde employed to form the resin. For reasons which are obvious the condensation product obtained appears to be described best in terms of the method of manufacture.

As previously stated the preparation of resins, the kind herein employed as reactants, is well known. See previously mentioned U. S. Patent 2,499,368. Resins can be made using an acid catalyst or basic catalyst or a catalyst having neither acid nor basic properties in the ordinary sense or without any catalyst at all. It is preferable that the resins employed be substantially neutral. In other words, if prepared by using a strong acid as a catalyst, such strong acid should be neutralized. Similarly, if a strong base is used as a catalyst it is preferable that the base be neutralized although I have found that sometimes the reaction described proceeded more rapidly in the presence of a small amount of a free base. The amount may be as small as a 200th of a percent and as much as a few 10ths of a percent. Sometimes moderate increase in caustic soda and caustic potash may be used. However, the most desirable procedure in practically every case is to have the resin neutral.

In preparing resins one does not get a single polymer, i. e., one having just 3 units, or just 4 units, or just 5 units, or just 6 units, etc. It is usually a mixture; for instance, one approximating 4 phenolic nuclei will have some trimer and pentamer present. Thus, the molecular weight may be such that it corresponds to a fractional value for $n$ as, for example, 3.5, 4.5 or 5.2.

In the actual manufacture of the resins I found no reason for using other than those which are lowest in price and most readily available commercially. For purpose of convenience suitable resins are characterized in the following table:

TABLE I

| Ex. No. | R | Position of R | R''' derived from— | $n$ | Mol. wt. of resin molecule |
|---|---|---|---|---|---|
| 1a | Nonyl | Para | Formaldehyde | 4.8 | 1,570.4 |
| 2a | Tertiary butyl | do | do | 3.5 | 882.5 |
| 3a | Secondary butyl | Ortho | do | 3.5 | 882.5 |
| 4a | Cyclohexyl | Para | do | 3.5 | 1,025.5 |
| 5a | Tertiary amyl | do | do | 3.5 | 959.5 |
| 6a | Mixed secondary and tertiary amyl | Ortho | do | 3.5 | 805.5 |
| 7a | Propyl | Para | do | 3.5 | 805.5 |
| 8a | Tertiary hexyl | do | do | 3.5 | 1,036.5 |
| 9a | Octyl | do | do | 3.5 | 1,190.5 |
| 10a | Nonyl | do | do | 3.5 | 1,267.5 |
| 11a | Decyl | do | do | 3.5 | 1,344.5 |
| 12a | Dodecyl | do | do | 3.5 | 1,498.5 |
| 13a | Tertiary butyl | do | Acetaldehyde | 3.5 | 945.5 |
| 14a | Tertiary amyl | do | do | 3.5 | 1,022.5 |
| 15a | Nonyl | do | do | 3.5 | 1,330.5 |
| 16a | Tertiary butyl | do | Butyraldehyde | 3.5 | 1,071.5 |
| 17a | Tertiary amyl | do | do | 3.5 | 1,148.5 |
| 18a | Nonyl | do | do | 3.5 | 1,456.5 |
| 19a | Tertiary butyl | do | Propionaldehyde | 3.5 | 1,008.5 |
| 20a | Tertiary amyl | do | do | 3.5 | 1,085.5 |
| 21a | Nonyl | do | do | 3.5 | 1,393.5 |
| 22a | Tertiary butyl | do | Formaldehyde | 4.2 | 996.6 |
| 23a | Tertiary amyl | do | do | 4.2 | 1,083.4 |
| 24a | Nonyl | do | do | 4.2 | 1,430.6 |
| 25a | Tertiary butyl | do | do | 4.8 | 1,094.4 |
| 26a | Tertiary amyl | do | do | 4.8 | 1,189.6 |

PART 2

As has been pointed out previously, the amine herein employed as a reactant is a basic secondary monoamine, and preferably a strongly basic secondary monoamine, free from hydroxyl groups whose composition is indicated thus:

in which R' represents a monovalent alkyl, alicyclic, arylalkyl radical and may be heterocyclic in a few instances as in the case of piperidine and a secondary amine derived from furfurylamine by methylation or ethylation, or a similar procedure.

Another example of a heterocyclic amine is, of course, morpholine.

The secondary amines most readily available are, of course, amines such as dimethylamine, methylethylamine, diethylamine, dipropylamine, ethylpropylamine, dibutylamine, diamylamine, dihexylamine, dioctylamine, and dinonylamine. Other amines include bis(1,3-dimethylbutyl)amine. There are, of course, a variety of primary amines which can be reacted with an alkylating agent such as dimethyl sulfate, diethyl sulfate, an alkyl bromide, an ester of sulfonic acid, etc., to produce suitable amines within the herein specified limitations. For example, one can methylate alpha-methylbenzylamine, or benzylamine itself, to produce a suitable reactant. Needless to say, one can use secondary amines, such as dicyclohexylamine, dibutylamine or amines containing one cyclohexyl group and one alkyl group, or one benzyl group and one alkyl group, such as ethylcyclohexyl amine, ethylbenzylamine, etc.

Another class of amines which are particularly desirable for the reason that they introduce a definite hydrophile effect by virtue of an ether linkage, or repetitious ether linkage, are certain basic polyether amines of the formula

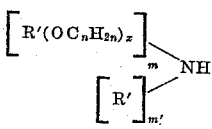

in which $x$ is a small whole number having a value of 1 or more, and may be as much as 10 or 12; $n$ is an integer having a value of 2 to 4, inclusive; $m$ represents the numeral 1 to 2; and $m'$ represents a number 0 to 1, with the proviso that the sum of $m$ plus $m'$ equals 2; and R'' has its prior significance, particularly as a hydrocarbon radical.

The preparation of such amines has been described in the literature and particularly in two United States patents, to wit, U. S. Nos. 2,325,514, dated July 27, 1943, to Hester, and 2,355,337 dated August 8, 1944, to Spence. The latter patent describes typical haloalkyl ethers such as $$CH_3OC_2H_4Cl$$

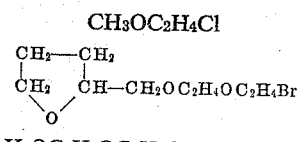

$$C_2H_5OC_2H_4OC_2H_4OC_2H_4Cl$$

Such haloalkyl ethers can react with ammonia, or with a primary amine such as methylamine, ethylamine, cyclohexylamine, etc., to produce a secondary amine of the kind above described, in which one of the groups attached to nitrogen is typified by R'. Such haloalkyl ethers also can be reacted with ammonia to give secondary amines as described in the first of the two patents mentioned immediately preceding. Compounds so obtained are exemplified by $$(C_2H_5OC_2H_4OC_2H_4)_2NH$$

$$(C_8H_{17}OC_2H_4OC_2H_4OC_2H_4)_2NH$$

$$(C_4H_9OCH_2CH(CH_3)O(CH_3)CHCH_2)_2NH$$

$$(CH_3OCH_2CH_2OCH_2CH_2OCH_2CH_2)_2NH$$

$$(CH_3OCH_2CH_2CH_2CH_2CH_2CH_2)_2NH$$

Other somewhat similar secondary amines are those of the composition

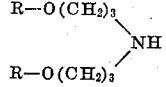

as described in U. S. Patent No. 2,375,659 dated May 8, 1945, to Jones et al. In the above formula R may be methyl, ethyl, propyl, amyl, octyl, etc.

Other amines can be obtained from products which are sold in the open market, such as may be obtained by alkylation of cylohexylmethylamine or the alkylation of similar primary amines, or, for that matter, amines of the kind described in U. S. Patent No. 2,482,546 dated September 20, 1949, to Kaszuba, provided there is no negative group or halogen attached to the phenolic nucleus. Examples include the following: beta-phenoxyethylamine, gamma-phenoxypropylamine, beta-phenoxyalpha-methylethylamine, and beta-phenoxypropylamine.

Other suitable amines are the kind described in British Patent No. 456,517 and may be illustrated by

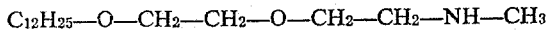

PART 3

The products obtained by the herein described processes represent cogeneric mixtures which are the result of a condensation reaction or reactions. Since the resin molecule cannot be defined satisfactorily by formula, although it may be so illustrated in an idealized simplification, it is difficult to actually depict the final product of the cogeneric mixture except in terms of the process itself.

Previous reference has been made to the fact that the procedure herein employed is comparable, in a general way, to that which corresponds to somewhat similar derivatives made either from phenols as differentiated from a resin, or in the manufacture of a phenol-amine-aldehyde resin; or else from a particularly selected resin and an amine and formaldehyde in the manner described in Bruson Patent No. 2,031,557 in order to obtain a heat-reactive resin. Since the condensation products obtained are not heat-convertible and since manufacture is not restricted to a single phase system, and since temperatures up to 150° C. or thereabouts may be employed, it is obvious that the procedure becomes comparatively simple. Indeed, perhaps no description is necessary over and above what has been said previously, in light subsequent examples. However, for purpose of clarify the following details are included.

A convenient piece of equipment for preparation of these cogeneric mixtures is a resin pot of the kind described in aforementioned U. S. Patent No. 2,499,368. In most instances the resin selected is not apt to be a fusible liquid at the early or low temperature stage of reaction if employed as subsequently described; in fact, usually it is apt to be a solid at distinctly higher temperatures, for instance, ordinary room temperature. Thus, I have found it convenient to use a solvent and particularly one which can be removed readily at a comparatively moderate temperature, for instance, at 150° C. A suitable solvent is usually benzene, xylene, or a comparable petroleum hydrocarbon or a mixture of such or similar solvents. Indeed, resins which are not soluble except in oxygenated solvents or mixtures containing such solvents are not here included as raw materials. The reaction can be conducted in such a way that the initial reaction, and perhaps the bulk of the reaction, takes place in a polyphase system. However, if desirable, one can use an oxygenated solvent such as a low-boiling alcohol, including ethyl alcohol, methyl alcohol, etc. Higher alcohols can be used or one can use a comparatively non-volatile solvent such as dioxane or the diethylether of ethylene glycol. One can also use a mixture of benzene or xylene and such oxygenated solvents. Note that the use of such oxygenated solvent is not required in the sense that it is not necessary to use an initial resin which is soluble only in an oxygenated solvent as just noted, and it is not necessary to have a single phase system for reaction.

Actually, water is apt to be present as a solvent for the reason that in most cases aqueous formaldehyde is employed, which may be the commercial product which is approximately 37%, or it may be diluted down to about 30% formaldehyde. However, paraformaldehyde can be used but it is more difficult perhaps to add a solid material instead of the liquid solution and, everything else being equal, the latter is apt to be more economical. In any event, water is present as water of reaction. If the solvent is completely removed at the end of the process, no problem is involved if the material is used for any subsequent reaction. However, if the reaction mass is going to be subjected to some further reaction where the solvent may be objectionable, as in the case of ethyl or hexyl alcohol, and if there is to be subsequent oxyalkylation, then, obviously, the alcohol should not be used or else it should be removed. The fact that an oxygenated solvent need not be employed, of course, is an advantage for reasons stated.

Another factor, as far as the selection of solvent goes, is whether or not the cogeneric mixture obtained at the end of the reaction is to be used as such or in the salt form. The cogeneric mixtures obtained are apt to be solids or thick viscous liquids in which there is some change from the initial resin itself, particularly if some of the initial solvent is apt to remain without complete removal. Even if one starts with a resin which is almost water-white in color, the products obtained are almost invariably a dark red in color or at least a red-amber, or some color which includes both an amber component and a reddish component. By and large, the melting point is apt to be lower and the products may be more sticky and more tacky than the original resin itself. Depending on the resin selected and on the amine selected the condensation product or reaction mass on a solvent-free basis may be hard, resinous and comparable to the resin itself.

The products obtained, depending on the reactants selected, may be water-insoluble or water-dispersible, or water-soluble, or close to being water-soluble. Water solubility is enhanced, of course, by making a solution in the acidified vehicle such as a dilute solution, for instance, a 5% solution of hydrochloric acid, acetic acid, hydroxyacetic acid, etc. One also may convert the finished product into salts by simply adding a stoichiometric amount of any selected acid and removing any water present by refluxing with benzene or the like. In fact, the selection of the solvent employed may depend in part whether or not the product at the completion of the reaction is to be converted into a salt form.

In the next succeeding paragraph it is pointed out that frequently it is convenient to eliminate all solvent, using a temperature of not over 150° C. and employing vacuum, if required. This applies, of course, only to those circumstances where it is desirable or necessary to remove the solvent. Petroleum solvents, aromatic solvents, etc., can be used. The selection of solvent, such as benzene, xylene, or the like, depends primarily on cost, i. e., the use of the most economical solvent and also on three other factors, two of which have been previously mentioned; (a) is the solvent to remain in the reaction mass without removal? (b) is the reaction mass to be subjected to further reaction in which the solvent, for instance, an alcohol, either low boiling or high boiling, might interfere as in the case of oxyalkylation?; and the third factor is this, (c) is an effort to be made to purify the reaction mass by the usual procedures as, for example, a water-wash to remove the water-soluble unreacted formaldehyde, if any, or a water-wash to remove any unreacted low molal soluble amine, if employed and present after reaction? Such procedures are well known and, needless to say, certain solvents are more suitable than others. Everything else being equal, I have found xylene the most satisfactory solvent.

I have found no particular advantage in using a low temperature in the early stage of the reaction because, and for reasons explained, this is not necessary although it does apply in some other procedures that, in a general way, bear some similarity to the present procedure. There is no objection, of course, to giving the reaction an opportunity to proceed as far as it will at some low temperature, for instance, 30° to 40° but ultimately one must employ the higher temperature in order to obtain products of the kind herein described. If a lower temperature reaction is used initially the period is not critical, in fact, it may be anything from a few hours up to 24 hours. I have not found any case where it was necessary or even desirable to hold the low temperature stage for more than 24 hours. In fact, I am not convinced there is any advantage in holding it at this stage for more than 3 or 4 hours at the most. This, again, is a matter of convenience largely for one reason. In heating and stirring the reaction mass there is a tendency for formaldehyde to be lost. Thus, if the reaction can be conducted at a lower temperature so as to use up part of the formaldehyde at such lower temperature, then the amount of unreacted formaldehyde is decreased subsequently and makes it easier to prevent any loss. Here, again, this lower temperature is not necessary by virtue of heat convertibility as previously referred to.

If solvents and reactants are selected so the reactants and products of reaction are mutually soluble, then agitation is required only to the extent that it helps cooling or helps distribution of the incoming formaldehyde. This mutual solubility is not necessary as previously pointed out but may be convenient under certain circumstances. On the other hand, if the products are not mutually soluble then agitation should be more vigorous for the reason that reaction probably takes place principally at the interfaces and the more vigorous the agitation the more interfacial area. The general procedure employed is invariably the same when adding the resin and the selected solvent, such as benzene or xylene. Refluxing should be long enough to insure that the resin added, preferably in a powdered form, is completely soluble. However, if the resin is prepared as such it may be added in solution form, just as preparation is described in aforementioned U. S. Patent 2,499,368. After the resin is in complete solution the amine is added and stirred. Depending on the amine selected, it may or may not be soluble in the resin solution. If it is not soluble in the resin solution it may be soluble in the aqueous formaldehyde solution. If so, the resin then will dissolve in the formaldehyde solution as added, and if not, it is even possible that the initial reaction mass could be a three-phase system instead of a two-phase system although this would be extremely unusual. This solution, or mechanical mixture, if not completely soluble is cooled to at least the reaction temperature or somewhat below, for example 35° C. or slightly lower, provided this initial low temperature stage is employed. The formaldehyde is then added in a suitable form. For reason pointed out I prefer to use a solution and whether to use a commercial 37% concentration is simply a matter of choice. In large scale manufacturing there may be some advantage in using a 30% solution of formaldehyde but apparently this is not true on a small laboratory scale or pilot plant scale. 30% formaldehyde may tend to decrease any formaldehyde loss or make it easier to control unreacted formaldehyde loss.

On a large scale if there is any difficulty with formaldehyde loss control, one can use a more dilute form of formaldehyde, for instance, a 30% solution. The reaction can be conducted in an autoclave and no attempt made to remove water until the reaction is over. Generally speaking, such a procedure is much less satisfactory for a number of reasons. For example, the reaction does not seem to go to completion, foaming takes place, and other mechanical or chemical difficulties are involved. I have found no advantage in using solid formaldehyde because even here water of reaction is formed.

Returning again to the preferred method of reaction and particularly from the standpoint of laboratory procedure employing a glass resin pot, when the reaction has proceeded as one can reasonably expect at a low temperature, for instance, after holding the reaction mass with or without stirring, depending on whether or not it is homogeneous, at 30° or 40° C. for 4 or 5 hours, or at the most, up to 10–24 hours, I then complete the reaction by raising the temperature up to 150° C., or thereabouts as required. The initial low temperature procedure can be eliminated or reduced to merely the shortest period of time which avoids loss of amine or formaldehyde. At a higher temperature I use a phase-separating trap and subject the mixture to reflux condensation until the water of reaction and the water of solution of the formaldehyde is eliminated. I then permit the temperature to rise to somewhere about 100° C., and generally slightly above 100° C., and below 150° C. by eliminating the solvent or part of the solvent so the reaction mass stays within this predetermined range. This period of heating and refluxing, after the water is eliminated, is continued until the reaction mass is homogeneous and then for one to three hours longer. The removal of the solvents is conducted in a conventional manner in the same way as the removal of solvents in resin manufacture as described in aforementioned U. S. Patent No. 2,499,368.

Needless to say, as far as the ratio of reactants goes I have invariably employed approximately one mole of the resin based on the molecular weight of the resin molecule, 2 moles of the secondary amine and 2 moles of formaldehyde. In some instances I have added a trace of caustic as an added catalyst but have found no particular advantage in this. In other cases I have used a slight excess of formaldehyde and, again, have not found any particular advantage in this. In other cases I have used a slight excess of amine and, again, have not found any particular advantage in so doing. Whenever feasible I have checked the completeness of reaction in the usual ways, including the amount of water of reaction, molecular weight, and particularly in some instances have checked whether or not the end-product showed surface-activity, particularly in a dilute acetic acid solution. The nitrogen content after removal of unreacted amine, if any is present, is another index.

In the hereto attached claims reference is made to the product as such, i. e., the anhydro base. Needless to say, the hydrated base, i. e., the material as it combines with water or the salt form, with a combination of suitable acids as noted, is essentially the same material but is merely another form and, thus, the claims are intended to cover all three forms, i. e., the anhydro base, the free base, and the salts.

In light of what has been said previously, little more need be said as to the actual procedure employed for the preparation of the herein described condensation products. The following example will serve by way of illustration:

*Example 1b*

The phenol-aldehyde resin is the one that has been identified previously as Example 2a. It was obtained from a paratertiary butyl phenol and formaldehyde. The resin was prepared using an acid catalyst which was completely neutralized at the end of the reaction. The molecular weight of the resin was 882.5. This corresponded to an average of about 3½ phenolic nuclei, as the value for n which excludes the 2 external nuclei, i. e., the resin was largely a mixture having 3 nuclei and 4 nuclei excluding the 2 external nuclei, or 5 and 6 overall nuclei. The resin so obtained in a neutral state had a light amber color.

882 grams of the resin identified as 2a, preceding, were powdered and mixed with an equal weight of xylene, i. e., 882 grams. The mixture was refluxed until solution was complete. It was then adjusted to approximately 30° to 35° C., and 146 grams of diethylamine added. The mixture was stirred vigorously and formaldehyde added slowly. The formaldehyde was used as a 37% solution and 162 grams were employed, which were added in about 2½ hours. The mixture was stirred vigorously and kept within a temperature range of 30° to 45° C. for about 20 hours. At the end of this period of time it was refluxed, using a phase-separating trap and a small amount of aqueous distillate withdrawn from time to time, and the presence of unreacted formaldehyde noted. Any unreacted formaldehyde seemed to disappear within 2 to 3 hours after refluxing was started. As soon as the odor of formaldehyde was no longer detectible the phase-separating trap was set so as to eliminate all water of solution and reaction. After the water was eliminated part of the xylene was removed until the temperature reached approximately 145° C., or slightly higher. The mass was kept at this higher temperature for about 4 hours and reaction stopped. During this time any additional water, which was probably water of reaction which had formed, was eliminated by means of the trap. The residual xylene was permitted to stay in the cogeneric mixture. A small amount of the sample was heated on a water bath to remove the excess xylene and the residual material was dark red in color and had the consistency of a sticky fluid or tacky resin. The overall time for the reaction was about 30 hours. In other examples it varied from 24 hours to 36 hours. Time can be reduced by cutting low temperature period to approximately 3 to 6 hours.

Note that in Table II following there are a large number of added examples illustrating the same procedure. In each case the initial mixture was stirred and held at a fairly low temperature (30° to 40° C.) for a period of several hours. Then refluxing was employed until the odor of formaldehyde disappeared. After the odor of formaldehyde disappeared the phase-separating trap was employed to separate out all the water, both the solution and condensation. After all the water had been separated enough xylene was taken out to have the final product reflux for several hours somewhere in the range of 145° to 150° C., or thereabouts. Usually the mixture yielded a clear solution by the time the bulk of the water, or all of the water, had been removed.

Note that as pointed out previously, this procedure is illustrated by 24 examples in Table II.

which permits continuous oxypropylation and oxyethylation. More specific reference will be made to treatment with glycide subsequently in the text. The oxyethylation step is, of course, the same as the oxypropylation step insofar that two low boiling liquids are handled in each instance. What immediately follows refers to oxyethylation and it is understood that oxypropylation can be handled conveniently in exactly the same manner.

The oxyethylation procedure employed in the preparation of derivatives of the preceding intermediates has been uniformly the same, particularly in light of the fact that a continuous operating procedure was employed. In this particular procedure the autoclave was a conventional jacketed autoclave, made of stainless steel and having a capacity of approximately 25 gallons, and a working pressure of 300 pounds gauge pressure. The autoclave was equipped with the conventional devices and openings, such as the variable speed stirrer operating at speeds from 50 R. P. M. to 500 R. P. M., thermometer well and thermocouple for recorder controller; emptying outlet, pressure gauge, manual and rupture disc vent lines; charge hole for initial reactants; at least one connection for conducting the incoming alkylene oxide, such as ethylene oxide, to the bottom of the autoclave; along with suitable devices for both cooling and heating the autoclave through the jacket. Also, I prefer coils in addition thereto, with the coils so arranged that they are suitable for heating with steam or cooling with water, and the jacket further equipped with electrical heating devices, such as are employed for hot oil or Dowtherm systems. Dowtherm, more specifically Dowtherm A, is a colorless non-corrosive liquid consisting of an eutectic mixture of diphenyl and diphenyl oxide. Such autoclaves are, of course, in essence, small scale replicas of the usual conventional autoclave used in commercial oxyalkylating procedure.

Continuous operation, or substantially continuous operation, is achieved by the use of a separate container to hold the alkylene oxide being employed, particularly ethylene oxide. The container consists essentially of a laboratory bomb having a capacity of about 10 to 15

TABLE II

| Ex. No. | Resin used | Amt., grs. | Amine used and amount | Strength of formaldehyde soln. and amt. | Solvent used and amt. | Reaction temp., °C. | Reaction time (hrs.) | Max. distill. temp., °C. |
|---|---|---|---|---|---|---|---|---|
| 1b | 2a | 882 | Diethylamine, 146 grams | 37%, 162 g | Xylene, 882 g | 20–25 | 30 | 150 |
| 2b | 5a | 480 | Diethylamine, 73 grams | 37%, 81 g | 480 g | 22–30 | 24 | 152 |
| 3b | 10a | 633 | Diethylamine, 73 grams | 30%, 100 g | 633 g | 21–24 | 38 | 147 |
| 4b | 2a | 441 | Dibutylamine, 129 grams | 37%, 81 g | 441 g | 25–37 | 32 | 149 |
| 5b | 5a | 480 | Dibutylamine, 129 grams | 37%, 81 g | 480 g | 20–24 | 35 | 149 |
| 6b | 10a | 633 | Dibutylamine, 129 grams | 37%, 81 g | 633 g | 18–23 | 24 | 150 |
| 7b | 2a | 882 | Morpholine, 174 grams | 37%, 162 g | 882 g | 20–26 | 35 | 145 |
| 8b | 5a | 480 | Morpholine, 87 grams | 37%, 81 g | 480 g | 19–27 | 24 | 156 |
| 9b | 10a | 633 | Morpholine, 87 grams | 37%, 81 g | 633 g | 20–23 | 24 | 147 |
| 10b | 13a | 473 | Dioctylamine (di-2-ethylhexylamine), 117 grams | 30%, 100 g | 473 g | 20–21 | 38 | 148 |
| 11b | 14a | 511 | Dioctylamine (di-2-ethylhexylamine), 117 grams | 30%, 100 g | 511 g | 19–20 | 30 | 146 |
| 12b | 15a | 665 | Dioctylamine (di-2-ethylhexylamine), 117 grams | 37%, 100 g | 665 g | 20–26 | 24 | 150 |
| 13b | 2a | 441 | $(C_2H_5OC_2H_4OC_2H_4)NH$, 250 grams | 30%, 100 g | 441 g | 20–22 | 31 | 147 |
| 14b | 5a | 480 | $(C_2H_5OC_2H_4OC_2H_4)NH$, 250 grams | 30%, 100 g | 480 g | 20–24 | 36 | 148 |
| 15b | 9a | 595 | $(C_2H_5OC_2H_4OC_2H_4)_2NH$, 250 grams | 37%, 81 g | 595 g | 23–28 | 25 | 145 |
| 16b | 2a | 441 | $(C_4H_9OCH_2CH(CH_3)O(CH_3)CHCH_2)_2NH$, 361 grams | 37%, 81 g | 441 g | 21–23 | 24 | 151 |
| 17b | 5a | 480 | $(C_4H_9OCH_2CH(CH_3)O(CH_3)CHCH_2)_2NH$, 361 grams | 37%, 81 g | 480 g | 20–24 | 24 | 150 |
| 18b | 14a | 511 | $(C_4H_9OCH_2CH(CH_3)O(CH_3)CHCH_2)_2NH$, 361 grams | 30%, 100 g | 511 g | 20–22 | 25 | 146 |
| 19b | 22a | 498 | $(CH_3OCH_2CH_2OCH_2CH_2OCH_2CH_2)_2NH$, 309 grams | 37%, 81 g | 498 g | 20–25 | 24 | 140 |
| 20b | 23a | 542 | $(CH_3OCH_2CH_2OCH_2CH_2OCH_2CH_2)_2NH$, 309 grams | 37%, 81 g | 542 g | 28–38 | 30 | 142 |
| 21b | 25a | 547 | $(CH_3OCH_2CH_2OCH_2CH_2OCH_2CH_2)_2NH$, 309 grams | 37%, 81 g | 547 g | 25–30 | 26 | 148 |
| 22b | 2a | 441 | $(CH_3OCH_2CH_2CH_2CH_2CH_2CH_2)_2NH$, 245 grams | 37%, 81 g | 441 g | 20–22 | 28 | 143 |
| 23b | 26a | 595 | $(CH_3OCH_2CH_2CH_2CH_2CH_2CH_2)_2NH$, 245 grams | 30%, 100 g | 595 g | 18–20 | 25 | 146 |
| 24b | 1a | 391 | $(CH_3OCH_2CH_2CH_2CH_2CH_2)_2NH$, 98 grams | 30%, 50 g | 391 g | 19–22 | 24 | 145 |

PART 4

In preparing oxyalkylated derivatives of products of the kind which appear as examples in Part 3, I have found it particularly advantageous to use laboratory equipment gallons or somewhat in excess thereof. This bomb was equipped, also, with an inlet for charging, and an outlet tube going to the bottom of the container so as to permit discharging of alkylene oxide in the liquid phase to the autoclave. Other conventional equipment consists, of course, of the rupture disc, pressure gauge, sight feed glass, thermometer, connection for nitrogen for pressuring bomb, etc. The bomb was placed on a scale during use and the connections between the bomb and the autoclave were flexible stainless hose or tubing so that continuous weighings could be made without breaking or making any connections. This also applied to the nitrogen line, which was used to pressure the bomb reservoir. To the extent that it was required, any other usual conventional procedure or addition which provided greater safety was used, of course, such as safety glass, protective screens, etc.

With this particular arrangement practically all oxyethylations became uniform in that the reaction temperature could be held within a few degrees of any selected point in this particular range. In the early stages where the concentration of catalyst is high the temperature was generally set for around 130° C. or thereabouts. Subsequently the temperature may be somewhat higher for instance, 135° C. to 140° C. Under other conditions, definitely higher temperatures may be employed, for instance 170° C. to 175° C. It will be noted by examination of subsequent examples that this temperature range was satisfactory. In any case, where the reaction goes more slowly a higher temperature may be used, for instance, 140° C. to 145° C., and if need be 150° C. to 160° C. Incidentally, oxypropylation takes place more slowly than oxyethylation as a rule and for this reason I have used a temperature of approximately 135° C. to 140° C., as being particularly desirable for initial oxypropylation, and have stayed within the range of 130° C. to 135° C. almost invariably during oxypropylation. The lesser reactivity of propylene oxide compared with ethylene oxide can be offset by use of more catalyst, more vigorous agitation and perhaps a longer time period. The ethylene oxide was forced in by means of nitrogen pressure as rapidly as it was absorbed as indicated by the pressure gauge on the autoclave. In case the reaction slowed up the temperature was raised so as to speed up the reaction somewhat by use of extreme heat. If need be, cooling water was employed to control the temperature.

As previously pointed out in the case of oxypropylation as differentiated from oxyethylation, there was a tendency for the reaction to slow up as the temperature dropped much below the selected point of reaction, for instance, 135° C. In this instance, the technique employed was the same as before, that is, either cooling water was cut down or steam was employed, or the addition of propylene oxide speeded up, or electric heat used in addition to the steam in order that the reaction proceeded at, or near, the selected temperatures to be maintained.

Inversely, if the reaction proceeded too fast regardless of the particular alkylene oxide, the amount of reactant being added, such as ethylene oxide, was cut down or electrical heat was cut off, or steam was reduced, or if need be, cooling water was run through both the jacket and the cooling coil. All these operations, of course, are depending on the required number of conventional gauges, check valves, etc., and the entire equipment, as has been pointed out, is conventional and, as far as I am aware can be furnished by at least two firms who specialize in the manufacture of this kind of equipment.

Attention is directed to the fact that the use of glycide requires extreme caution. This is particularly true on any scale other than small laboratory or semi-pilot plant operations. Purely from the standpoint of safety in the handling of glycide, attention is directed to the following: (a) If prepared from glycerol monochlorohydrin, this product should be comparatively pure; (b) the glycide itself should be as pure as possible as the effect of impurities is difficult to evaluate; (c) the glycide should be introduced carefully and precaution should be taken that it reacts as promptly as introduced, i. e., that no excess of glycide is allowed to accumulate; (d) all necessary precautions should be taken that glycide cannot polymerize per se; (e) due to the high boiling point of glycide one can readily employ a typical separatable glass resin pot as described in U. S. Patent No. 2,499,370 dated March 7, 1950, and offered for sale by numerous laboratory supply houses. If such arrangement is used to prepare laboratory scale duplications, then care should be taken that the heating mantle can be removed rapidly so as to allow for cooling; or better still, through an added opening at the top, the glass resin pot or comparable vessel should be equipped with a stainless steel cooling coil so that the pot can be cooled more rapidly than mere removal of mantle. If a stainless steel coil is introduced it means that conventional stirrer of the paddle type is changed into the centrifugal type which causes the fluids or reactants to mix due to swirling action in the center of the pot. Still better, is the use of a laboratory autoclave of the kind previously described in this part of the text, but in any event, when the initial amount of glycide is added to a suitable reactant, such as the herein described amine-modified phenol-aldehyde resin, the speed of reaction should be controlled by the usual factors, such as (a) the addition of glycide; (b) the elimination of external heat, and (c) use of cooling coil so there is no undue rise in temperature. All the foregoing is merely conventional but is included due to the hazard in handling glycide.

Although ethylene oxide and propylene oxide may represent less of a hazard than glycide, yet these reactants should be handled with extreme care. One suitable procedure involves the use of propylene oxide or butylene oxide as a solvent as well as a reactant in the earlier stages along with ethylene oxide, for instance, by dissolving the appropriate resin condensate in propylene oxide even though oxyalkylation is taking place to a greater or lesser degree. After a solution has been obtained which represents the selected resin condensate dissolved in propylene oxide or butylene oxide, or a mixture which includes the oxyalkylated product, ethylene oxide is added to react with the liquid mass until hydrophile properties are obtained, if not previously present to the desired degree. Indeed hydrophile character can be reduced or balanced by use of some other oxide such as propylene oxide or butylene oxide. Since ethylene oxide is more reactive than propylene oxide or butylene oxide, the final product may contain some unreacted propylene oxide or butylene oxide, the final product may contain some unreacted propylene oxide or butylene oxide which can be eliminated by volatilization or distillation in any suitable manner. See article entitled "Ethylene oxide hazards and methods of handling," Industrial and Engineering Chemistry, volume 42, No. 6, June 1950, pp. 1251–1258. Other procedures can be employed as, for example, that described in U. S. Patent No. 2,586,767, dated February 19, 1952, to Wilson.

*Example 1c*

The oxyalkylation-susceptible compound employed is the one previously described and designated as Example 1b. Condensate 1b was in turn obtained from diethylamine and the resin previously identified as Example 2a. Reference to Table I shows that this particular resin is obtained from paratertiarylbutylphenol and formaldehyde. 10.56 pounds of this resin condensate were dissolved in 8.8 pounds of solvent (xylene) along with one pound of finely powdered caustic soda as a catalyst. Adjustment was made in the autoclave to operate at a temperature of approximately 125° C. to 130° C., and at a pressure of about 15 to 20 pounds.

The time regulator was set so as to inject the ethylene oxide in approximately three hours and then continue stirring for a half-hour or longer. The reaction went readily and, as a matter of fact, the ethylene oxide could have been injected in less than an hour's time and probably the reaction could have been completed without allowing for a subsequent stirring period. The speed of reaction, particularly at the low pressure, undoubtedly was due in a large measure to excellent agitation and also to the comparatively high concentration of catalyst. The amount of ethylene oxide introduced was equal in weight to the initial condensation product, to wit, 10.56 pounds. This represented a molal ratio of 24 moles of ethylene oxide per mole of condensate.

The theoretical molecular weight at the end of the reaction period was 2112. A comparatively small sample, less than 50 grams, was withdrawn merely for examination as far as solubility or emulsifying power was concerned and also for the purpose of making some tests on various oil-field emulsions. The amount withdrawn was so small that no cognizance of this fact is included in the data, or subsequent data, or in the data presented in tabular form in subsequent Tables III and IV.

The size of the autoclave employed was 25 gallons. In innumerable comparable oxyalkylations I have withdrawn a substantial portion at the end of each step and continued oxyalkylation on a partial residual sample. This was not the case in this particular series. Certain examples were duplicated as hereinafter noted and subjected to oxyalkylation with a different oxide.

*Example 2c*

This example simply illustrates the further oxyalkylation of Example 1c, preceding. As previously stated, the oxyalkylation-susceptible compound, to wit, Example 1b, present at the beginning of the stage was obviously the same as at the end of the prior stage (Example 1c), to wit, 10.56 pounds. The amount of oxide present in the initial step was 10.56 pounds, the amount of catalyst remained the same, to wit, one pound, and the amount of solvent remained the same. The amount of oxide added was another 10.56 pounds, all addition of oxide in these various stages being based on the addition of this particular amount. Thus, at the end of the oxyethylation step the amount of oxide added was a total of 21.12 pounds and the molal ratio of ethylene oxide to resin condensate was 48 to 1. The theoretical molecular weight was 3168.

The maximum temperature during the operation was 125° C. to 130° C. The maximum pressure was in the range of 15 to 20 pounds. The time period was 3½ hours.

*Example 3c*

The oxyalkylation proceeded in the same manner described in Examples 1c and 2c. There was no added solvent and no added catalyst. The oxide added was 10.56 pounds and the total oxide in at the end of the oxyethylation step was 31.68 pounds. The molal ratio of oxide to condensate was 72 to 1. Conditions as far as temperature and pressure and time were concerned were all the same as in Examples 1c and 2c. The time period, as in Examples 1c and 2c, was 3½ hours.

*Example 4c*

The oxyethylation was continued and the amount of oxide added again was 10.56 pounds. There was no added catalyst and no added solvent. The theoretical molecular weight at the end of the reaction period was 5280. The molal ratio of oxide to condensate was 96 to 1. Conditions as far as temperature and pressure were concerned were the same as in previous examples. The time period was slightly longer, to wit, 4 hours. The reaction unquestionably began to slow up somewhat.

*Example 5c*

The oxyethylation continued with the introduction of another 10.56 pounds of ethylene oxide. No added solvent was introduced and, likewise, no added catalyst was introduced. The theoretical molecular weight at the end of the agitation period was 6336, and the molal ratio of oxide to resin condensate was 124 to 1. The time period, however, had increased to 5 hours even though the operating temperature and pressure remained the same as in previous example.

*Example 6c*

The same procedure was followed as in the previous examples except that an added ¼ pound of powdered caustic soda was introduced to speed up the reaction. The amount of oxide added was another 10.56 pounds, bringing the total oxide introduced to 63.36 pounds. The temperature and pressure during this period were the same as before.

Notwithstanding the addition of added caustic the time required for the oxyethylation was 5 hours. There was no added solvent.

*Example 7c*

The same procedure was followed as in the previous six examples without the addition of more caustic or more solvent. The total amount of oxide introduced at the end of the period was 72.93 pounds. The theoretical molecular weight at the end of the oxyalkylation period was 8448. The time required for the oxyethylation was a bit longer than in the previous step, to wit, 6 hours.

*Example 8c*

This was the final oxyethylation in this particular series. There was no added solvent and no added catalyst. The total amount of oxide added at the end of this step was 85.48 pounds. The theoretical molecular weight was 9604. The molal ratio of oxide to resin condensate was 192. Conditions as far as temperature and pressure were concerned were the same as in the previous examples and the time required for oxyethylation was the same as in Example 7c, preceding, to wit, 6 hours.

The same procedure as described in the previous examples was employed in connection with a number of the other condensates described previously. All these data have been presented in tabular form in a series of four tables, Tables III and IV, V and VI.

In substantially every case a 25-gallon autoclave was employed, although in some instances the initial oxyethylation was started in a 15-gallon autoclave and then transferred to a 25-gallon autoclave. This is immaterial but happened to be a matter of convenience only. The solvent used in all cases was xylene. The catalyst used was finely powdered caustic soda.

Referring now to Tables III and IV, it will be noted that compounds 1c through 40c were obtained by the use of ethylene oxide, whereas 41c through 80c were obtained by the use of propylene oxide alone.

Thus, in reference to Table III it is to be noted as follows.

The example number of each compound is indicated in the first column.

The identity of the oxyalkylation-susceptible compound, to wit, the resin condensate, is indicated in the second column.

The amount of condensate is shown in the third column.

Assuming that ethylene oxide alone is employed, as happens to be the case in Examples 1c through 40c, the amount of oxide present in the oxyalkylation derivative is shown in column 4, although in the initial step since no oxide is present there is a blank.

When ethylene oxide is used exclusively the 5th column is blank.

The 6th column shows the amount of powdered caustic soda used as a catalyst, and the 7th column shows the amount of solvent employed.

The 8th column can be ignored where a single oxide was employed.

The 9th column shows the theoretical molecular weight at the end of the oxyalkylation period.

The 10th column states the amount of condensate present in the reaction mass at the end of the period.

As pointed out previously, in this particular series the amount of reaction mass withdrawn for examination was so small that it was ignored and for this reason the resin condensate in column 10 coincides with the figure in column 3.

Column 11 shows the amount of ethylene oxide employed in the reaction mass at the end of the particular period.

Column 12 can be ignored insofar that no propylene oxide was employed.

Column 13 shows the catalyst at the end of the reaction period.

Column 14 shows the amount of solvent at the end of the reaction period.

Column 15 shows the molal ratio of ethylene oxide to condensate.

Column 16 can be ignored for the reason that no propylene oxide was employed.

Referring now to Table VI. It is to be noted that the first column refers to Examples 1c, 2c, 3c, etc.

The second column gives the maximum temperature employed during the oxyalkylation step and the third column gives the maximum pressure.

The fourth column gives the time period employed.

The last three columns show solubility tests by shaking a small amount of the compound, including the solvent present, with several volumes of water, xylene and kerosene. It sometimes happens that although xylene in comparatively small amounts will dissolve in the concentrated material, when the concentrated material in turn is diluted with xylene separation takes place.

Referring to Table IV, Examples 41c through 80c are the counterparts of Examples 1c through 40c, except that the oxide employed is propylene oxide instead of ethylene oxide. Therefore, as explained previously, four columns are blank, to wit, columns 4, 8, 11 and 15.

Reference is now made to Table V. It is to be noted these compounds are designated by "d," numbers, 1d, 2d, 3d, etc., through and including 32d. They are derived, in turn, from compounds in the "c" series, for example, 35c, 39c, 53c and 62c. These compounds involve the use of both ethylene oxide and propylene oxide. Since compounds 1c through 40c were obtained by the use of ethylene oxide, it is obvious that those obtained from 35c, through 39c, involve the use of ethylene oxide first, and propylene oxide afterward. Inversely, those compounds obtained from 53c and 62c obviously came from a prior series in which propylene oxide was used first.

In the preparation of this series indicated by the small letter "d," as 1d, 2d, 3d, etc., the initial "c" series such as 35c, 39c, 53c, and 62c, were duplicated and the oxyalkylation stopped at the point designated instead of being carried further as may have been the case in the original oxyalkylation step. Then oxyalkylation proceeded by using the second oxide as indicated by the previous explanation, to wit, propylene oxide in 1d through 16d, and ethylene oxide in 17d through 32d, inclusive.

In examining the table beginning with 1d, it will be noted that the initial product, i. e., 35c, consisted of the reaction product involving 10.5 pounds of the resin condensate, 15.84 pounds of ethylene oxide, 1.0 pound of caustic soda, and 8.8 pounds of the solvent.

It is to be noted that reference to the catalyst in Table V refers to the total amount of catalyst, i. e., the catalyst present from the first oxyalkylation step plus added catalyst, if any. The same is true in regard to the solvent. Reference to the solvent refers to the total solvent present, i. e., that from the first oxyalkylation step plus added solvent, if any.

In this series, it will be noted that the theoretical molecular weights are given prior to the oxyalkylation step and after the oxyalkylation step, although the value at the end of one step is the value at the beginning of the next step, except obviously at the very start the value depends on the theoretical molecular weight at the end of the initial oxyalkylation step; i. e., oxyethylation for 1d through 16d, and oxypropylation for 17d through 32d.

It will be noted also that under the molal ratio the values of both oxides to the resin condensate are included.

The data given in regard to the operating conditions is substantially the same as before and appears in Table VI.

The products resulting from these procedures may contain modest amounts, or have small amounts, of the solvents as indicated by the figures in the tables. If desired the solvent may be removed by distillation, and particularly vacuum distillation. Such distillation also may remove traces or small amounts of uncombined oxide, if present and volatile under the conditions employed.

Obviously, in the use of ethylene oxide and propylene oxide in combination one need not first use one oxide and then the other, but one can mix the two oxides and thus obtain what may be termed an indifferent oxyalkylation, i. e., no attempt to selectively add one and then the other, or any other variant.

Needless to say, one could start with ethylene oxide and then use propylene oxide, and then go back to ethylene oxide; or, inversely, start with propylene oxide, then use ethylene oxide, and then go back to propylene oxide; or, one could use a combination in which butylene oxide is used along with either one of the two oxides just mentioned, or a combination of both of them.

The colors of the products usually vary from a reddish amber tint to a definitely red; and amber. The reason is primarily that no effort is made to obtain colorless resins initially and the resins themselves may be yellow, amber, or even dark amber. Condensation of a nitrogenous product invariably yields a darker product than the original resin and usually has a reddish color. The solvent employed, if xylene, adds nothing to the color but one may use a darker colored aromatic petroleum solvent. Oxyalkylation generally tends to yield lighter colored products and the more oxide employed the lighter the color of the product. Products can be prepared in which the final color is a lighter amber with a reddish tint. Such products can be decolorized by the use of clays, bleaching chars, etc. As far as use in demulsification is concerned, or some other industrial uses, there is no justification for the cost of bleaching the product.

Generally speaking, the amount of alkaline catalyst present is comparatively small and it need not be removed. Since the products per se are alkaline due to the presence of a basic nitrogen, the removal of the alkaline catalyst is somewhat more difficult than ordinarily is the case for the reason that if one adds hydrochloric acid, for example, to neutralize the alkalinity one may partially neutralize the basic nitrogen radical also. The preferred procedure is to ignore the presence of the alkali unless it is objectionable or else add a stoichiometric amount of concentrated hydrochloric acid equal to the caustic soda present.

TABLE III

| Ex. No. | O-S cmpd., ex. No. | O-S* cmpd., lbs. | Ethyl. oxide, lbs. | Propl. oxide, lbs. | Catalyst, lbs. | Solvent, lbs. | Theo. mol. wt. | Theo. mol. wt. | O-S* cmpd., lbs. | Ethyl. oxide, lbs. | Propl. oxide, lbs. | Catalyst, lbs. | Solvent, lbs. | Ethyl. oxide to resin condensate | Propl. oxide to resin condensate |
|---|---|---|---|---|---|---|---|---|---|---|---|---|---|---|---|
| 1c | 1b | 10.56 |  |  | 1.0 | 8.8 |  | 2,112 | 10.56 | 10.56 |  | 1.0 | 8.8 | 24 |  |
| 2c | 1b | 10.56 | 10.56 |  | 1.0 | 8.8 |  | 3,168 | 10.56 | 21.12 |  | 1.0 | 8.8 | 48 |  |
| 3c | 1b | 10.56 | 21.12 |  | 1.0 | 8.8 |  | 4,224 | 10.56 | 31.68 |  | 1.0 | 8.8 | 72 |  |
| 4c | 1b | 10.56 | 31.68 |  | 1.0 | 8.8 |  | 5,280 | 10.56 | 42.24 |  | 1.0 | 8.8 | 96 |  |
| 5c | 1b | 10.56 | 42.24 |  | 1.0 | 8.8 |  | 6,336 | 10.56 | 52.80 |  | 1.0 | 8.8 | 124 |  |
| 6c | 1b | 10.56 | 52.80 |  | 1.25 | 8.8 |  | 7,392 | 10.56 | 63.36 |  | 1.25 | 8.8 | 144 |  |
| 7c | 1b | 10.56 | 63.36 |  | 1.25 | 8.8 |  | 8,448 | 10.56 | 73.92 |  | 1.25 | 8.8 | 168 |  |
| 8c | 1b | 10.56 | 73.92 |  | 1.25 | 8.8 |  | 9,604 | 10.56 | 85.48 |  | 1.25 | 8.8 | 192 |  |
| 9c | 5b | 12.56 |  |  | 1.0 | 9.6 |  | 2,512 | 12.56 | 12.56 |  | 1.0 | 9.6 | 28.6 |  |
| 10c | 5b | 12.56 | 12.56 |  | 1.0 | 9.6 |  | 3,768 | 12.56 | 25.12 |  | 1.0 | 9.6 | 57.2 |  |
| 11c | 5b | 12.56 | 25.12 |  | 1.0 | 9.6 |  | 5,024 | 12.56 | 37.68 |  | 1.0 | 9.6 | 85.8 |  |
| 12c | 5b | 12.56 | 37.68 |  | 1.0 | 9.6 |  | 6,280 | 12.56 | 50.24 |  | 1.0 | 9.6 | 114.4 |  |
| 13c | 5b | 12.56 | 50.24 |  | 1.0 | 9.6 |  | 7,536 | 12.56 | 62.80 |  | 1.0 | 9.6 | 143.0 |  |
| 14c | 5b | 12.56 | 62.80 |  | 1.5 | 9.6 |  | 8,792 | 12.56 | 75.36 |  | 1.5 | 9.6 | 171.6 |  |
| 15c | 5b | 12.56 | 75.63 |  | 1.5 | 9.6 |  | 10,048 | 12.56 | 87.92 |  | 1.5 | 9.6 | 200.2 |  |
| 16c | 5b | 12.56 | 87.92 |  | 1.5 | 9.6 |  | 11,304 | 12.56 | 100.48 |  | 1.5 | 9.6 | 228.8 |  |
| 17c | 7b | 10.84 |  |  | 1.0 | 8.8 |  | 2,168 | 10.84 | 10.84 |  | 1.0 | 8.8 | 24.6 |  |
| 18c | 7b | 10.84 | 10.84 |  | 1.0 | 8.8 |  | 3,252 | 10.84 | 21.68 |  | 1.0 | 8.8 | 49.2 |  |
| 19c | 7b | 10.84 | 21.68 |  | 1.0 | 8.8 |  | 4,336 | 10.84 | 32.52 |  | 1.0 | 8.8 | 73.8 |  |
| 20c | 7b | 10.84 | 32.52 |  | 1.0 | 8.8 |  | 5,420 | 10.84 | 43.36 |  | 1.0 | 8.8 | 98.4 |  |
| 21c | 7b | 10.84 | 43.36 |  | 1.0 | 8.8 |  | 6,504 | 10.84 | 54.20 |  | 1.0 | 8.8 | 123.0 |  |
| 22c | 7b | 10.84 | 54.20 |  | 1.25 | 8.8 |  | 7,588 | 10.84 | 65.04 |  | 1.25 | 8.8 | 147.6 |  |
| 23c | 7b | 10.84 | 65.04 |  | 1.25 | 8.8 |  | 8,672 | 10.84 | 75.88 |  | 1.25 | 8.8 | 172.2 |  |
| 24c | 7b | 10.84 | 75.88 |  | 1.25 | 8.8 |  | 9,756 | 10.84 | 86.72 |  | 1.25 | 8.8 | 196.8 |  |
| 25c | 11b | 12.84 |  |  | 1.0 | 10.2 |  | 2,568 | 12.84 | 12.84 |  | 1.0 | 10.2 | 29.2 |  |
| 26c | 11b | 12.84 | 12.84 |  | 1.0 | 10.2 |  | 3,852 | 12.84 | 25.68 |  | 1.0 | 10.2 | 58.4 |  |
| 27c | 11b | 12.84 | 25.68 |  | 1.0 | 10.2 |  | 5,136 | 12.84 | 38.52 |  | 1.0 | 10.2 | 87.6 |  |
| 28c | 11b | 12.84 | 38.52 |  | 1.0 | 10.2 |  | 6,420 | 12.84 | 51.36 |  | 1.0 | 10.2 | 116.8 |  |
| 29c | 11b | 12.84 | 51.36 |  | 1.0 | 10.2 |  | 7,704 | 12.84 | 64.20 |  | 1.0 | 10.2 | 146.0 |  |
| 30c | 11b | 12.84 | 64.20 |  | 1.5 | 10.2 |  | 8,988 | 12.84 | 77.04 |  | 1.5 | 10.2 | 175.2 |  |
| 31c | 11b | 12.84 | 77.04 |  | 1.5 | 10.2 |  | 10,272 | 12.84 | 89.88 |  | 1.5 | 10.2 | 204.4 |  |
| 32c | 11b | 12.84 | 89.88 |  | 1.5 | 10.2 |  | 11,556 | 12.84 | 102.72 |  | 1.5 | 10.2 | 233.6 |  |
| 33c | 1b | 10.56 |  |  | 1.0 | 8.8 |  | 1,584 | 10.56 | 5.28 |  | 1.0 | 8.8 | 12 |  |
| 34c | 1b | 10.56 | 5.28 |  | 1.0 | 8.8 |  | 2,112 | 10.56 | 10.56 |  | 1.0 | 8.8 | 24 |  |
| 35c | 1b | 10.56 | 10.56 |  | 1.0 | 8.8 |  | 2,640 | 10.56 | 15.84 |  | 1.0 | 8.8 | 36 |  |
| 36c | 1b | 10.56 | 15.84 |  | 1.0 | 8.8 |  | 3,168 | 10.56 | 21.12 |  | 1.0 | 8.8 | 48 |  |
| 37c | 1b | 10.56 | 21.12 |  | 1.0 | 8.8 |  | 3,696 | 10.56 | 26.40 |  | 1.0 | 8.8 | 60 |  |
| 38c | 1b | 10.56 | 26.40 |  | 1.0 | 8.8 |  | 4,224 | 10.56 | 31.68 |  | 1.0 | 8.8 | 72 |  |
| 39c | 1b | 10.56 | 31.68 |  | 1.0 | 8.8 |  | 4,752 | 10.56 | 36.96 |  | 1.0 | 8.8 | 84 |  |
| 40c | 1b | 10.56 | 36.96 |  | 1.0 | 8.8 |  | 5,280 | 10.56 | 42.24 |  | 1.0 | 8.8 | 96 |  |

*Oxyalkylation-susceptible.

TABLE IV

| Ex. No. | O-S cmpd., ex. No. | O-S* cmpd., lbs. | Ethyl. oxide, lbs. | Propl. oxide, lbs. | Catalyst, lbs. | Solvent, lbs. | Theo. mol. wt. | Theo. mol. wt. | O-S* cmpd., lbs. | Ethyl. oxide, lbs. | Propl. oxide, lbs. | Catalyst, lbs. | Solvent, lbs. | Ethyl. oxide to resin condensate | Propl. oxide to resin condensate |
|---|---|---|---|---|---|---|---|---|---|---|---|---|---|---|---|
| 41c | 1b | 10.56 |  |  | 1.0 | 8.8 |  | 2,112 | 10.56 |  | 10.56 | 1.0 | 8.8 |  | 18.2 |
| 42c | 1b | 10.56 |  | 10.56 | 1.0 | 8.8 |  | 3,168 | 10.56 |  | 21.12 | 1.0 | 8.8 |  | 36.4 |
| 43c | 1b | 10.56 |  | 21.12 | 1.0 | 8.8 |  | 4,224 | 10.56 |  | 31.68 | 1.0 | 8.8 |  | 54.6 |
| 44c | 1b | 10.56 |  | 31.68 | 1.0 | 8.8 |  | 5,280 | 10.56 |  | 42.24 | 1.0 | 8.8 |  | 72.8 |
| 45c | 1b | 10.56 |  | 42.24 | 1.0 | 8.8 |  | 6,336 | 10.56 |  | 52.80 | 1.0 | 8.8 |  | 91.0 |
| 46c | 1b | 10.56 |  | 52.80 | 1.5 | 8.8 |  | 8,348 | 10.56 |  | 73.92 | 1.5 | 8.8 |  | 127.4 |
| 47c | 1b | 10.56 |  | 73.92 | 1.5 | 8.8 |  | 10,560 | 10.56 |  | 95.04 | 1.5 | 8.8 |  | 163.8 |
| 48c | 1b | 10.56 |  | 95.04 | 1.5 | 8.8 |  | 12,672 | 10.56 |  | 116.16 | 1.5 | 8.8 |  | 200.2 |
| 49c | 5b | 12.56 |  |  | 1.2 | 9.6 |  | 2,512 | 12.56 |  | 12.56 | 1.2 | 9.6 |  | 21.6 |
| 50c | 5b | 12.56 |  | 12.56 | 1.2 | 9.6 |  | 3,768 | 12.56 |  | 25.12 | 1.2 | 9.6 |  | 43.2 |
| 51c | 5b | 12.56 |  | 25.12 | 1.2 | 9.6 |  | 5,024 | 12.56 |  | 37.68 | 1.2 | 9.6 |  | 64.8 |
| 52c | 5b | 12.56 |  | 37.68 | 1.2 | 9.6 |  | 6,280 | 12.56 |  | 50.24 | 1.2 | 9.6 |  | 86.4 |
| 53c | 5b | 12.56 |  | 50.24 | 1.2 | 9.6 |  | 7,836 | 12.56 |  | 62.80 | 1.2 | 9.6 |  | 108.0 |
| 54c | 5b | 12.56 |  | 62.80 | 1.2 | 9.6 |  | 10,048 | 12.56 |  | 87.92 | 1.2 | 9.6 |  | 151.2 |
| 55c | 5b | 12.56 |  | 87.92 | 1.2 | 9.6 |  | 12,560 | 12.56 |  | 113.04 | 1.2 | 9.6 |  | 194.8 |
| 56c | 5b | 12.56 |  | 113.04 | 1.2 | 9.6 |  | 15,072 | 12.56 |  | 138.16 | 1.2 | 9.6 |  | 238.2 |
| 57c | 7b | 10.84 |  |  | 1.0 | 8.8 |  | 2,168 | 10.84 |  | 10.84 | 1.0 | 8.8 |  | 18.7 |
| 58c | 7b | 10.84 |  | 10.84 | 1.0 | 8.8 |  | 3,252 | 10.84 |  | 21.68 | 1.0 | 8.8 |  | 37.4 |
| 59c | 7b | 10.84 |  | 21.68 | 1.0 | 8.8 |  | 4,336 | 10.84 |  | 32.52 | 1.0 | 8.8 |  | 56.1 |
| 60c | 7b | 10.84 |  | 32.52 | 1.0 | 8.8 |  | 5,420 | 10.84 |  | 43.36 | 1.0 | 8.8 |  | 74.8 |
| 61c | 7b | 10.84 |  | 43.36 | 1.0 | 8.8 |  | 6,504 | 10.84 |  | 54.20 | 1.0 | 8.8 |  | 93.5 |
| 62c | 7b | 10.84 |  | 54.20 | 1.0 | 8.8 |  | 8,672 | 10.84 |  | 75.88 | 1.0 | 8.8 |  | 130.9 |
| 63c | 7b | 10.84 |  | 75.88 | 1.0 | 8.8 |  | 10,840 | 10.84 |  | 97.56 | 1.0 | 8.8 |  | 170.3 |
| 64c | 7b | 10.84 |  | 97.56 | 1.0 | 8.8 |  | 13,008 | 10.84 |  | 119.24 | 1.0 | 8.8 |  | 205.7 |
| 65c | 11b | 12.84 |  |  | 1.0 | 10.2 |  | 2,568 | 12.84 |  | 12.84 | .6 | 10.2 |  | 22.2 |
| 66c | 11b | 12.84 |  | 12.84 | 1.0 | 10.2 |  | 3,852 | 12.84 |  | 25.68 | .6 | 10.2 |  | 44.3 |
| 67c | 11b | 12.84 |  | 25.68 | 1.0 | 10.2 |  | 5,136 | 12.84 |  | 38.52 | .6 | 10.2 |  | 66.4 |
| 68c | 11b | 12.84 |  | 38.52 | 1.0 | 10.2 |  | 6,420 | 12.84 |  | 51.36 | .6 | 10.2 |  | 88.5 |
| 69c | 11b | 12.84 |  | 51.36 | 1.0 | 10.2 |  | 7,704 | 12.84 |  | 64.20 | .6 | 10.2 |  | 110.6 |
| 70c | 11b | 12.84 |  | 64.20 | 1.25 | 10.2 |  | 10,272 | 12.84 |  | 89.88 | .9 | 10.2 |  | 154.8 |
| 71c | 11b | 12.84 |  | 89.88 | 1.25 | 10.2 |  | 12,840 | 12.84 |  | 115.56 | .9 | 10.2 |  | 199.5 |
| 72c | 11b | 12.84 |  | 115.56 | 1.25 | 10.2 |  | 15,408 | 12.84 |  | 141.24 | .9 | 10.2 |  | 244.0 |
| 73c | 1b | 10.56 |  |  | 1.0 | 8.8 |  | 1,584 | 10.56 |  | 5.28 | 1.0 | 8.8 |  | 9.1 |
| 74c | 1b | 10.56 |  | 5.28 | 1.0 | 8.8 |  | 2,112 | 10.56 |  | 10.56 | 1.0 | 8.8 |  | 18.2 |
| 75c | 1b | 10.56 |  | 10.56 | 1.0 | 8.8 |  | 2,640 | 10.56 |  | 15.84 | 1.0 | 8.8 |  | 27.3 |
| 76c | 1b | 10.56 |  | 15.84 | 1.0 | 8.8 |  | 3,168 | 10.56 |  | 21.12 | 1.0 | 8.8 |  | 36.4 |
| 77c | 1b | 10.56 |  | 21.12 | 1.0 | 8.8 |  | 3,696 | 10.56 |  | 26.40 | 1.0 | 8.8 |  | 45.5 |
| 78c | 1b | 10.56 |  | 26.40 | 1.0 | 8.8 |  | 4,752 | 10.56 |  | 36.96 | 1.0 | 8.8 |  | 63.7 |
| 79c | 1b | 10.56 |  | 36.96 | 1.25 | 8.8 |  | 5,808 | 10.56 |  | 47.42 | 1.25 | 8.8 |  | 81.9 |
| 80c | 1b | 10.56 |  | 47.52 | 1.25 | 8.8 |  | 6,864 | 10.56 |  | 58.08 | 1.25 | 8.8 |  | 100.1 |

*Oxyalkylation-susceptible.

TABLE V

| Ex. No. | Composition before | | | | | | | Composition at end | | | | | | Molal ratio | |
|---|---|---|---|---|---|---|---|---|---|---|---|---|---|---|---|
| | O-S cmpd., ex. No. | O-S* cmpd., lbs. | Ethyl. oxide, lbs. | Propl. oxide, lbs. | Catalyst, lbs. | Solvent, lbs. | Theo. mol. wt. | Theo. mol. wt. | O-S* cmpd., lbs. | Ethyl. oxide, lbs. | Propl. oxide, lbs. | Catalyst, lbs. | Solvent, lbs. | Ethyl. oxide to resin condensate | Propl. oxide to resin condensate |
| 1d | 35c | 10.56 | 15.84 | ---- | 1.0 | 8.8 | 2,640 | 3,168 | 10.56 | 15.84 | 5.28 | 1.0 | 8.8 | 36 | 9.1 |
| 2d | 35c | 10.56 | 15.84 | 5.28 | 1.0 | 8.8 | 3,168 | 3,696 | 10.56 | 15.84 | 10.56 | 1.0 | 8.8 | 36 | 18.2 |
| 3d | 35c | 10.56 | 15.84 | 10.56 | 1.0 | 8.8 | 3,696 | 4,224 | 10.56 | 15.84 | 15.84 | 1.0 | 8.8 | 36 | 27.3 |
| 4d | 35c | 10.56 | 15.84 | 15.84 | 1.0 | 8.8 | 4,224 | 4,752 | 10.56 | 15.84 | 21.12 | 1.0 | 8.8 | 36 | 36.4 |
| 5d | 35c | 10.56 | 15.84 | 21.12 | 1.5 | 8.8 | 4,752 | 5,380 | 10.56 | 15.84 | 26.40 | 1.5 | 8.8 | 36 | 45.5 |
| 6d | 35c | 10.56 | 15.84 | 26.40 | 1.5 | 8.8 | 5,380 | 5,908 | 10.56 | 15.84 | 31.68 | 1.5 | 8.8 | 36 | 54.6 |
| 7d | 35c | 10.56 | 15.84 | 31.68 | 1.5 | 8.8 | 5,908 | 6,438 | 10.56 | 15.84 | 36.96 | 1.5 | 8.8 | 36 | 63.7 |
| 8d | 35c | 10.56 | 15.84 | 36.96 | 1.5 | 8.8 | 6,438 | 6,964 | 10.56 | 15.84 | 42.24 | 1.5 | 8.8 | 36 | 72.8 |
| 9d | 39c | 10.56 | 36.96 | ---- | 1.5 | 8.8 | 4,752 | 5,280 | 10.56 | 36.96 | 5.28 | 1.5 | 8.8 | 84 | 9.1 |
| 10d | 35c | 10.56 | 36.96 | 5.28 | 1.5 | 8.8 | 5,280 | 5,808 | 10.56 | 36.96 | 10.56 | 1.5 | 8.8 | 84 | 18.2 |
| 11d | 39c | 10.56 | 36.96 | 10.56 | 1.5 | 8.8 | 5,808 | 6,336 | 10.56 | 36.96 | 15.84 | 1.5 | 8.8 | 84 | 27.3 |
| 12d | 39c | 10.56 | 36.96 | 15.84 | 1.5 | 8.8 | 6,336 | 7,392 | 10.56 | 36.96 | 26.40 | 1.5 | 8.8 | 84 | 45.5 |
| 13d | 39c | 10.56 | 36.96 | 26.40 | 1.5 | 8.8 | 7,392 | 8,448 | 10.56 | 36.96 | 36.96 | 1.5 | 8.8 | 84 | 63.7 |
| 14d | 39c | 10.56 | 36.96 | 36.96 | 1.5 | 8.8 | 8,448 | 9,504 | 10.56 | 36.96 | 47.52 | 1.5 | 8.8 | 84 | 81.9 |
| 15d | 39c | 10.56 | 36.96 | 47.52 | 1.5 | 8.8 | 9,504 | 10,560 | 10.56 | 36.96 | 58.08 | 1.5 | 8.8 | 84 | 100.1 |
| 16d | 39c | 10.56 | 36.96 | 59.08 | 1.5 | 8.8 | 10,560 | 11,616 | 10.56 | 36.96 | 68.64 | 1.5 | 8.8 | 84 | 118.3 |
| 17d | 53c | 12.56 | 62.80 | ---- | 1.8 | 9.6 | 7,836 | 8,464 | 12.56 | 6.28 | 62.80 | 1.7 | 9.6 | 14.3 | 108.0 |
| 18d | 53c | 12.56 | 6.28 | 62.80 | 1.7 | 9.6 | 8,464 | 9,092 | 12.56 | 12.56 | 62.80 | 1.7 | 9.6 | 28.6 | 108.0 |
| 19d | 53c | 12.56 | 12.56 | 62.80 | 1.7 | 9.6 | 9,092 | 10,348 | 12.56 | 18.84 | 62.80 | 1.7 | 9.6 | 42.8 | 108.0 |
| 20d | 53c | 12.56 | 18.84 | 62.80 | 1.7 | 9.6 | 10,348 | 11,604 | 12.56 | 31.40 | 62.80 | 1.7 | 9.6 | 71.4 | 108.0 |
| 21d | 53c | 12.56 | 31.40 | 62.80 | 1.7 | 9.6 | 11,604 | 12,360 | 12.56 | 43.96 | 62.80 | 1.7 | 9.6 | 99.9 | 108.0 |
| 22d | 53c | 12.56 | 43.96 | 62.80 | 1.7 | 9.6 | 12,860 | 14,116 | 12.56 | 56.52 | 62.80 | 1.7 | 9.6 | 128.5 | 108.0 |
| 23d | 53c | 12.56 | 56.52 | 62.80 | 1.7 | 9.6 | 14,116 | 15,372 | 12.56 | 69.08 | 62.80 | 1.7 | 9.6 | 157.0 | 108.0 |
| 24d | 53c | 12.56 | 69.08 | 62.80 | 1.7 | 9.6 | 15,372 | 16,628 | 12.56 | 81.64 | 62.80 | 1.7 | 9.6 | 185.8 | 108.0 |
| 25d | 62c | 10.84 | ---- | 75.88 | 1.5 | 8.8 | 8,672 | 9,214 | 10.84 | 5.42 | 75.88 | 1.5 | 8.8 | 12.3 | 130.9 |
| 26d | 62c | 10.84 | 5.42 | 75.88 | 1.5 | 8.8 | 9,214 | 9,756 | 10.84 | 10.84 | 75.88 | 1.5 | 8.8 | 24.6 | 130.9 |
| 27d | 62c | 10.84 | 10.84 | 75.88 | 1.5 | 8.8 | 9,756 | 10,298 | 10.84 | 16.26 | 75.88 | 1.5 | 8.8 | 36.9 | 130.9 |
| 28d | 62c | 10.84 | 16.26 | 75.88 | 1.5 | 8.8 | 10,298 | 11,382 | 10.84 | 27.10 | 75.88 | 1.5 | 8.8 | 61.5 | 130.9 |
| 29d | 62c | 10.84 | 27.10 | 75.88 | 1.5 | 8.8 | 11,382 | 12,466 | 10.84 | 37.94 | 75.88 | 1.5 | 8.8 | 86.1 | 130.9 |
| 30d | 62c | 10.84 | 37.94 | 75.88 | 1.5 | 8.8 | 12,466 | 13,550 | 10.84 | 48.78 | 75.88 | 1.5 | 8.8 | 110.7 | 130.9 |
| 31d | 62c | 10.84 | 48.78 | 75.88 | 1.5 | 8.8 | 13,550 | 14,634 | 10.84 | 75.88 | 75.88 | 1.5 | 8.8 | 135.3 | 130.9 |
| 32d | 62c | 10.84 | 59.62 | 75.88 | 1.5 | 8.8 | 14,634 | 16,626 | 10.84 | 75.88 | 75.88 | 1.5 | 8.8 | 172.0 | 130.9 |

*Oxyalkylation-susceptible.

TABLE VI

| Ex. No. | Max. temp., °C. | Max. pres., p.s.i. | Time, hrs. | Solubility | | |
|---|---|---|---|---|---|---|
| | | | | Water | Xylene | Kerosene |
| 1c | 125–130 | 15–20 | 3½ | Insoluble | | |
| 2c | 125–130 | 15–20 | 3½ | Emulsifiable | | |
| 3c | 125–130 | 15–20 | 3½ | Soluble | | |
| 4c | 125–130 | 15–20 | 4 | ...do... | | |
| 5c | 125–130 | 15–20 | 5 | ...do... | | |
| 6c | 125–130 | 15–20 | 5 | ...do... | | |
| 7c | 125–130 | 15–20 | 6 | ...do... | | |
| 8c | 125–130 | 15–20 | 6 | ...do... | | |
| 9c | 125–130 | 15–20 | 3 | Insoluble | | |
| 10c | 125–130 | 15–20 | 2½ | Emulsifiable | | |
| 11c | 125–130 | 15–20 | 3 | Soluble | | |
| 12c | 125–130 | 15–20 | 3 | ...do... | | |
| 13c | 125–130 | 15–20 | 3½ | ...do... | | |
| 14c | 125–130 | 15–20 | 5 | ...do... | | |
| 15c | 125–130 | 15–20 | 6 | ...do... | | |
| 16c | 125–130 | 15–20 | 6 | ...do... | | |
| 17c | 130–135 | 15–20 | 4 | Insoluble | | |
| 18c | 130–135 | 15–20 | 3 | Emulsifiable | | |
| 19c | 130–135 | 15–20 | 3 | Soluble | | |
| 20c | 130–135 | 15–20 | 4 | ...do... | | |
| 21c | 130–135 | 15–20 | 4 | ...do... | | |
| 22c | 130–135 | 15–20 | 3 | ...do... | | |
| 23c | 130–135 | 15–20 | 3½ | ...do... | | |
| 24c | 130–135 | 15–20 | 4 | ...do... | | |
| 25c | 125–130 | 5–10 | 2 | Insoluble | | |
| 26c | 125–130 | 5–10 | 2 | Emulsifiable | | |
| 27c | 125–130 | 5–10 | 2½ | Soluble | | |
| 28c | 125–130 | 5–10 | 3 | ...do... | | |
| 29c | 125–130 | 5–10 | 4 | ...do... | | |
| 30c | 125–130 | 5–10 | 3 | ...do... | | |
| 31c | 125–130 | 5–10 | 4 | ...do... | | |
| 32c | 125–130 | 5–10 | 5 | ...do... | | |
| 33c | 125–130 | 10–15 | 1½ | Insoluble | | |
| 34c | 125–130 | 10–15 | 1½ | ...do... | | |
| 35c | 125–130 | 10–15 | 2 | Emulsifiable | | |
| 36c | 125–130 | 10–15 | 3 | ...do... | | |
| 37c | 125–130 | 10–15 | 3 | Soluble | | |
| 38c | 125–130 | 10–15 | 4 | ...do... | | |
| 39c | 125–130 | 10–15 | 4½ | ...do... | | |
| 40c | 125–130 | 10–15 | 5 | ...do... | | |
| 41c | 130–135 | 10–15 | 2½ | Insoluble | Soluble | Insoluble |
| 42c | 130–135 | 10–15 | 3 | ...do... | Dispersible | Do. |
| 43c | 130–135 | 10–15 | 3 | ...do... | ...do... | Soluble |
| 44c | 130–135 | 10–15 | 3½ | ...do... | ...do... | Do. |
| 45c | 130–135 | 10–15 | 4 | ...do... | ...do... | Do. |
| 46c | 130–135 | 10–15 | 4 | ...do... | ...do... | Do. |
| 47c | 130–135 | 10–15 | 4 | ...do... | ...do... | Do. |
| 48c | 130–135 | 10–15 | 5 | ...do... | ...do... | Do. |
| 49c | 125–130 | 5–10 | 1 | ...do... | ...do... | Insoluble |
| 50c | 125–130 | 5–10 | 1½ | ...do... | ...do... | Do. |
| 51c | 125–130 | 5–10 | 1½ | ...do... | ...do... | Dispersible |
| 52c | 125–130 | 5–10 | 2 | ...do... | ...do... | Soluble |
| 53c | 125–130 | 5–10 | 3 | Insoluble | Soluble | Soluble |
| 54c | 125–130 | 5–10 | 3 | ...do... | ...do... | Do. |
| 55c | 125–130 | 5–10 | 3½ | ...do... | ...do... | Do. |
| 56c | 125–130 | 5–10 | 4 | ...do... | ...do... | Do. |
| 57c | 125–130 | 5–10 | 1 | ...do... | ...do... | Insoluble |
| 58c | 125–130 | 5–10 | 1½ | ...do... | ...do... | Do. |
| 59c | 125–130 | 5–10 | 1½ | ...do... | ...do... | Dispersible |
| 60c | 125–130 | 5–10 | 1¾ | ...do... | ...do... | Soluble |
| 61c | 125–130 | 5–10 | 2 | ...do... | ...do... | Do. |
| 62c | 125–130 | 5–10 | 3 | ...do... | ...do... | Do. |
| 63c | 125–130 | 5–10 | 4 | ...do... | ...do... | Do. |
| 64c | 125–130 | 5–10 | 5 | ...do... | ...do... | Do. |
| 65c | 125–130 | 10–15 | 1½ | ...do... | ...do... | Insoluble |
| 66c | 125–130 | 10–15 | 2 | ...do... | ...do... | Do. |
| 67c | 125–130 | 10–15 | 2 | ...do... | ...do... | Dispersible |
| 68c | 125–130 | 10–15 | 3 | ...do... | ...do... | Do. |
| 69c | 125–130 | 10–15 | 5 | ...do... | ...do... | Soluble |
| 70c | 125–130 | 10–15 | 3 | ...do... | ...do... | Do. |
| 71c | 125–130 | 10–15 | 3½ | ...do... | ...do... | Do. |
| 72c | 125–130 | 10–15 | 4 | ...do... | ...do... | Do. |
| 73c | 125–130 | 15–20 | 1 | ...do... | ...do... | Insoluble |
| 74c | 125–130 | 15–20 | 1¼ | ...do... | ...do... | Do. |
| 75c | 125–130 | 15–20 | 1¾ | ...do... | ...do... | Do. |
| 76c | 125–130 | 15–20 | 2½ | ...do... | ...do... | Dispersible |
| 77c | 125–130 | 15–20 | 3 | ...do... | ...do... | Do. |
| 78c | 125–130 | 15–20 | 4 | ...do... | ...do... | Soluble |
| 79c | 125–130 | 15–20 | 3½ | ...do... | ...do... | Do. |
| 80c | 125–130 | 15–20 | 5 | ...do... | ...do... | Do. |
| 1d | 125–130 | 15–20 | 2 | Emulsifiable | ...do... | Insoluble |
| 2d | 125–130 | 15–20 | 2½ | ...do... | ...do... | Do. |
| 3d | 125–130 | 15–20 | 3 | ...do... | ...do... | Do. |
| 4d | 125–130 | 15–20 | 4 | Insoluble | ...do... | Do. |
| 5d | 125–130 | 15–20 | 2¼ | ...do... | ...do... | Do. |
| 6d | 125–130 | 15–20 | 2½ | ...do... | ...do... | Do. |
| 7d | 125–130 | 15–20 | 3 | ...do... | ...do... | Do. |
| 8d | 125–130 | 15–20 | 3½ | ...do... | ...do... | Do. |
| 9d | 125–135 | 20–25 | ½ | Soluble | ...do... | Do. |
| 10d | 125–135 | 20–25 | 1 | ...do... | ...do... | Do. |
| 11d | 125–135 | 20–25 | 1¼ | Emulsifiable | ...do... | Do. |
| 12d | 125–135 | 20–25 | 2½ | ...do... | ...do... | Do. |
| 13d | 125–135 | 20–25 | 3 | ...do... | ...do... | Do. |
| 14d | 125–135 | 20–25 | 4 | Emulsifiable to Insoluble | ...do... | Do. |
| 15d | 125–135 | 20–25 | 4 | ...do... | ...do... | Do. |
| 16d | 125–135 | 20–25 | 5 | Insoluble | ...do... | Soluble |
| 17d | 130–135 | 20–25 | ½ | ...do... | ...do... | Do. |
| 18d | 130–135 | 20–25 | ½ | ...do... | ...do... | Do. |
| 19d | 130–135 | 20–25 | ½ | ...do... | ...do... | Do. |
| 20d | 130–135 | 20–25 | ¾ | Emulsifiable | ...do... | Do. |
| 21d | 130–135 | 20–25 | 1½ | ...do... | ...do... | Do. |
| 22d | 130–135 | 20–25 | 2¾ | ...do... | ...do... | Do. |
| 23d | 130–135 | 20–25 | 3½ | ...do... | ...do... | Do. |

TABLE VI—Continued

| Ex. No. | Max. temp., °C. | Max. pres., p.s.i. | Time, hrs. | Solubility | | |
|---|---|---|---|---|---|---|
| | | | | Water | Xylene | Kerosene |
| 24d | 130-135 | 20-25 | 4 | Soluble | Soluble | Soluble. |
| 25d | 125-130 | 20-30 | ½ | Insoluble | do | Do. |
| 26d | 125-130 | 20-30 | ½ | do | do | Do. |
| 27d | 125-130 | 20-30 | 1 | Emulsifiable | do | Dispersible. |
| 28d | 125-130 | 20-30 | 1¾ | do | do | Insoluble. |
| 29d | 125-130 | 20-30 | 2 | do | do | Do. |
| 30d | 125-130 | 20-30 | 3 | do | do | Do. |
| 31d | 125-130 | 20-30 | 4½ | Emulsifiable to Soluble. | do | Do. |
| 32d | 125-130 | 20-30 | 5 | Soluble | do | Do. |

PART 5

The products described in Part 4 have utility in at least two distinct ways—the products as such or in the form of some simple derivative, such as the salt, which can be used in numerous arts subsequently described. Also, the products can serve as initial materials for more complicated reactions of the kind ordinarily involving a hydroxyl radical. This includes esterification, etherization, etc. Likewise, the group including the nitrogen atom can be reacted with suitable reactants such as chloroacetic acid esters, benzyl chloride, alkyl halides, esters of sulfonic acids, methyl sulfate, or the like, so as to give new ammonium compounds which may be used, not only for the purpose herein described, but also for various other uses.

The products herein described as such and prepared in accordance with this invention can be used as emulsifying agents, for oils, fats, and waxes, as ingredients in insecticide compositions, or as detergents and wetting agents in the laundering, scouring, dyeing, tanning and mordanting industries. They may also be used for preparing boring or metal-cutting oils and cattle dips, as metal pickling inhibitors, and for pharmaceutical purposes.

Other uses include the preparation or resolution of petroleum emulsions, whether of the water-in-oil type or oil-in-water type. They may be used as additives in connection with other emulsifying agents; they may be employed to contribute hydrotropic effects; they may be used as anti-strippers in connection with asphalts; they may be used to prevent corrosion, particularly the corrosion of ferrous metals for various purposes and particularly in connection with the production of oil and gas, and also in refineries where crude oil is converted into various commercial products. The products may be used industrially to inhibit or stop microorganic growth or other objectionable lower forms of life, such as the growth of algae, or the like; they may be used to inhibit the growth of bacteria, molds, etc.; they are valuable additives to lubricating oils, both those derived from petroleum and synthetic lubricating oils, and also to hydraulic brake fluids of the aqueous or nonaqueous type. Some have definite anti-corrosive action; they may be used in connection with other processes where they are injected into an oil or gas well for purpose of removing a mud sheath, for increasing the ultimate flow of fluid from the surrounding strata, and particularly in secondary recovery operations using aqueous flood waters; and for use in dry cleaners' soaps.

With regard to the above statements, reference is made particularly to the use of the materials as such, or in the form of a salt; the salt form refers to a salt involving either one or both basic nitrogen atoms. Obviously, the salt form involves a modification in which the hydrophile character can either be increased or decreased and, inversely, the hydrophobe character can be decreased or increased. For example, neutralizing the product with practically any low molal acid, such as acetic acid, hydroxy acetic acid, lactic acid, or nitric acid, is apt to markedly increase the hydrophile effect. One may also use acids of the type $$R-O-CH_2-CH_2-O-CH_2-CH_2-O-CH_2-COOH$$

in which R is a comparatively small alkyl radical, such as methyl, ethyl or propyl. The hydrophile effect may be decreased and the hydrophobe effect increased by neutralization with a monocarboxy detergent-forming acid. These are acids which have at least 8 and not more than 32 carbon atoms. They are obtained from higher fatty acids and include also resin acids such as abietic acid, and petroleum acids such as naphthenic acids and acids obtained by the oxidation of wax. One can also obtain new products having unique properties by combination with polybasic acids, such as diglycolic acid, oxalic acid, dimerized acids from linseed oil, etc. The most common examples, of course, are the higher fatty acids having generally 10 to 18 carbon atoms. I have found that a particularly valuable anticorrosive agent can be obtained from any suitable resin and formaldehyde provided the secondary amine is dicyclohexylamine. The corrosion-inhibiting properties of this compound can be increased by neutralization with either one or two moles of an oil-soluble sulfonic acid, particularly a sulfonic acid of the type known as mahogany sulfonic acid.

The oil-soluble sulfonic acids previously referred to may be synthetically derived by sulfonating olefins, aliphatic fatty acids, or their esters, alkylated aromatics or their hydroxyl derivatives, partially hydrogenated aromatics, etc., with sulfuric acid or other sulfonating agents. However, the soaps of so-called mahogany acids which are usually produced during treatment of lubricating oil distillates with concentrated sulfuric acid (85% or higher concentration) remain in the oil after settling out sludge. These sulfonic acids may be represented as

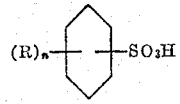

where $(R)_n$ is one or more alkyl, alkaryl or aralkyl groups and the aromatic nucleus may be a single or condensed ring or a partially hydrogenated ring. The lower molecular weight acids can be extracted from the acid-treated oil by adding a small amount of water, preferably after dilution of the oil with kerosene. However, the more desirable high molecular weight (350–500) acids, particularly those produced when treating petroleum distillates with fuming acid to produce white oil, are normally recovered as sodium soaps by neutralizing the acid oil with sodium hydroxide or carbonate and extracting with aqueous alcohol. The crude soap extract is first recovered as a water curd after removal of alcohol by distillation and a gravity separation of some of the contaminating salts (sodium carbonate, sulfates and sulfites). These materials still contain considerable quantities of salts and consequently are normally purified by addition of a more concentrated alcohol followed by storage to permit settling of salt brine. The alcohol and water are then stripped out and the sodium salts so obtained converted into free acids.

Not only can one obtain by-product sulfonic acids of the mahogany type which are perfectly satisfactory and within the molecular range of 300 to 600 but also one can obtain somewhat similar materials which are obtained as the principal product of reaction and have all the usual characteristics of normal by-product sulfonic acids but in some instances contain two sulfonic groups, i. e., are disulfonic acids. This type of mahogany acid or, better still, oil-soluble sulfonic acid, is perfectly satisfactory for the above described purpose.

Much of what has been said previously is concerned with derivatives in which the hydrophile properties are enhanced in comparison with the resin as such. A procedure designed primarily to enhance the hydrophobe properties of the resin involves derivatives obtained by a phenyl or substituted phenyl glycidyl ether of the structure

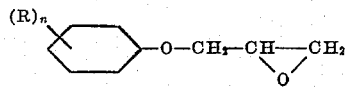

in which $R_n$ represents a hydrocarbon substituent such as an alkyl radical having 1 to 24 carbon atoms, or a cyclic group, such as a cyclohexyl group, a phenyl group, or a benzyl group, and $n$ represents 0, 1, 2 or 3. $n$ is zero in the instance of the unsubstituted phenyl radical. Such compounds are in essence oxyalkylating agents and reaction involves the introduction of a hydrophobe group and the formation of an alkanol hydroxl radical.

The compounds herein described and particularly those adapted for breaking petroleum emulsions, although having other uses as herein noted, are derived from resins in which the bridge between phenolic nuclei is a methylene group or a substituted methylene group.

Comparable amine-modified compounds serving all these various purposes are obtainable from another class of resins, i. e., those in which the phenolic nuclei are separated by a radical having at least a 3-carbon atom chain and are obtained, not by the use of a single aldehyde but by the use of formaldehyde, in combination with a carbonyl compound selected from the class of aldehydes and ketones in which there is an alpha hydrogen atom available as in the case of acetaldehyde or acetone. Such resins almost invariably involve the use of a basic catalyst. Such bridge radicals between phenolic nuclei have either hydroxyl radicals or carbonyl radicals, or both, and are invariably oxyalkylation-susceptible and may also enter into more complicated reactants with basic secondary amines. The bridge radical in the initial resin has distinct hydrophile character. Such resins or compounds which can be converted readily into such resins are described in the following patents. Such analogous compounds are not included as part of the instant invention.

U. S. Patent Nos. 2,191,802, dated February 27, 1940, to Novotny et al.; 2,448,664, dated September 27, 1948, to Fife et al.; 2,538,883, dated January 23, 1951, to Schrimpe; 2,538,884, dated January 23, 1951, to Schrimpe; 2,545,559, dated March 20, 1951, to Schrimpe; 2,570,389, dated October 9, 1951, to Schrimpe.

See my co-pending applications, Serial Nos. 301,804, 301,805, 301,806, and 301,807, all filed July 30, 1952.

Having thus described my invention, what I claim as new and desire to obtain by Letters Patent, is:

1. The process of first condensing (a) an oxyalkylation-susceptible, fusible, non-oxygenated organic solvent-soluble, water-insoluble, low-stage phenolaldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of phenols of functionality greater than 2; said phenol being of the formula

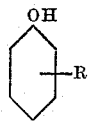

in which R is an aliphatic hydrocarbon radical having at least 4 and not more than 24 carbon atoms which is substituted in one of the 2, 4, and 6-positions of the phenolic nucleus; (b) a basic nonhydroxylated secondary monoamine having not more than 32 carbon atoms in any group attached to the amino nitrogen atom, and (c) formaldehyde; said condensation reaction being conducted at a temperature sufficiently high to eliminate water and below the pyrolytic point of the reactants and resultants of reaction; the molar ratio of the reactants a, b and c being approximately 1:2:2, respectively and with the proviso that the resinous condensation product resulting from the process be heat-stable and oxyalkylation-susceptible; thereafter oxyalkylating the resulting condensation product by means of an alpha-beta alkylene oxide having not more than 4 carbon atoms and selected from the class consisting of ethylene oxide, propylene oxide, butylene oxide, glycide and methylglycide.

2. The process of first condensing (a) an oxyethylation-susceptible, fusible, non-oxygenated organic solvent-soluble, water-insoluble, low-stage phenol-formaldehyde resin having an average molecular weight corresponding to at least 3 and not over 5 phenolic nuclei per resin molecule; said resin being difunctional only in regard to methylol-forming reactivity; said resin being derived by reaction between a difunctional monohydric phenol and formaldehyde; said resin being formed in the substantial absence of phenols of functionality greater than 2; said phenol being of the formula

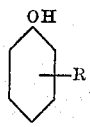

in which R is an aliphatic hydrocarbon radical having at least 4 and not more than 14 carbon atoms which is substituted in one of the 2, 4, and 6-positions of the phenolic nucleus; (b) a basic nonhydroxylated secondary monoamine having not more than 32 carbon atoms in any group attached to the amino nitrogen atom, and (c) formaldehyde; said condensation reaction being conducted at a temperature sufficiently high to eliminate water and below the pyrolytic point of the reactants and resultants of reaction, with the proviso that the condensation reaction be conducted so as to produce a significant portion of the resultant in which each of the three reactants have contributed part of the ultimate molecule by virtue of a formaldehyde-derived methylene bridge connecting the amino nitrogen atom with a resin molecule; with the added proviso that the ratio of reactants be approximately 1,2 and 2, respectively; with the further proviso that said procedure involve the use of a solvent; and with the final proviso that the resinous condensation product resulting from the process be heat-stable and oxyalkylation-susceptible; thereafter oxyalkylating said condensation product by means of an alpha-beta alkylene oxide having not more than 4 carbon atoms and selected from the class consisting of ethylene oxide, propylene oxide, butylene oxide, glycide and methylglycide.

3. The process of claim 1 wherein the oxyalkylation step is limited to the use of both ethylene oxide and propylene oxide in combination.

4. The process of claim 2 wherein the oxyalkylation step is limited to the use of both ethylene oxide and propylene oxide in combination.

5. The product resulting from the process defined in claim 1.

6. The product resulting from the process defined in claim 2.

7. The product resulting from the process defined in claim 3.

8. The product resulting from the process defined in claim 4.

References Cited in the file of this patent

UNITED STATES PATENTS

| | | |
|---|---|---|
| 2,031,557 | Bruson | Feb. 18, 1936 |
| 2,499,368 | De Groote | Mar. 7, 1950 |